(12) United States Patent
Pratt, Jr. et al.

(10) Patent No.: US 12,393,170 B2
(45) Date of Patent: **\*Aug. 19, 2025**

(54) DIGITAL SAFETY LOCKS IN INDUSTRIAL PROCESS PLANTS

(71) Applicant: FIELDCOMM GROUP, INC., Austin, TX (US)

(72) Inventors: Wallace A. Pratt, Jr., Pflugerville, TX (US); Mark J. Nixon, Thorndale, TX (US)

(73) Assignee: FIELDCOMM GROUP, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,436

(22) Filed: Jan. 4, 2024

(65) Prior Publication Data

US 2024/0134335 A1  Apr. 25, 2024

Related U.S. Application Data

(63) Continuation of application No. 17/470,799, filed on Sep. 9, 2021, now Pat. No. 11,880,181.

(51) Int. Cl.
G05B 19/048 (2006.01)

(52) U.S. Cl.
CPC .. *G05B 19/048* (2013.01); *G05B 2219/24024* (2013.01); *G05B 2219/25428* (2013.01)

(58) Field of Classification Search
CPC ............ G05B 2219/24024; G05B 2219/25428
See application file for complete search history.

(56) References Cited

U.S. PATENT DOCUMENTS

| 2002/0036568 | A1 | 3/2002 | Bredow et al. |
| 2005/0060554 | A1 | 3/2005 | O'Donoghue |
| 2006/0136998 | A1 | 6/2006 | Oowaki et al. |
| 2013/0214903 | A1 | 8/2013 | Kalous et al. |
| 2016/0284144 | A1 | 9/2016 | Michalscheck et al. |
| 2017/0132861 | A1 | 5/2017 | Ho et al. |

(Continued)

OTHER PUBLICATIONS

International Search Report and Written Opinion for Application No. PCT/US22/39958, date mailed Oct. 28, 2022.

(Continued)

*Primary Examiner* — Zhipeng Wang
(74) *Attorney, Agent, or Firm* — MARSHALL, GERSTEIN & BORUN LLP

(57) ABSTRACT

A digital safety lock of a field device or other process plant equipment activates in response to receiving a request from a locking party, thereby placing the device into a locked mode. While the device is in the locked mode, only the locking party may perform maintenance activities on, or otherwise functionally control, the device. While locked, the device may provide an indication of the locking party to any other device or application attempting to access or control the locked device. Other devices, applications, and users may communicate with the locking party or locking party device to request that the device be unlocked and/or to request the corresponding digital safety lock key. Upon the device receiving the correct digital safety lock key, the digital safety lock may be deactivated, and the device may enter into an unlocked state if no other digital safety locks remain activated for the device.

40 Claims, 9 Drawing Sheets

(56) References Cited

U.S. PATENT DOCUMENTS

| | | | | |
|---|---|---|---|---|
| 2018/0321661 A1* | 11/2018 | Main-Reade | ...... | G05B 19/4185 |
| 2019/0219991 A1* | 7/2019 | Main-Reade | .... | G05B 19/41875 |
| 2020/0162468 A1 | 5/2020 | Faist et al. | | |
| 2020/0339064 A1* | 10/2020 | Gengler | ............ | G07C 9/00571 |
| 2021/0116262 A1 | 4/2021 | Gupta et al. | | |
| 2022/0375293 A1* | 11/2022 | Zhang | ................ | G07C 9/00563 |

OTHER PUBLICATIONS

International Preliminary Report on Patentability issued in PCT Patent Application No. PCT/US2022/039958 dated Mar. 21, 2024.
Supplementary European Search Report issued in European U.S. Appl. No. 22/867,873 dated May 22, 2025.

* cited by examiner

DIGITAL SAFETY LOCKS IN INDUSTRIAL PROCESS PLANTS

RELATED APPLICATION

This application is a continuation application of and claims priority to U.S. patent application Ser. No. 17/470,799, entitled "Digital Safety Locks in Industrial Process Plants," which was filed on Sep. 1, 2021, the entire disclosure of which is hereby expressly incorporated by reference herein.

FIELD OF THE DISCLOSURE

The present disclosure generally relates to industrial process plants and process control systems and, more particularly, to a digital safety lock for safely securing devices and equipment in industrial process plants.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, actuators, variable speed drives, switches, and transmitters (e.g., temperature, pressure, level and flow rate sensors), are located within the process environment (also interchangeably referred to herein as the plant or field environment) and generally functionally perform physical or process control functions such as opening or closing valves, measuring process and/or environmental parameters such as temperature or pressure, etc. to control one or more processes executing within the process plant or system. Smart field devices, such as the field devices conforming to the well-known FOUNDATION® Fieldbus protocol or other suitable industrial automation protocols may also functionally perform control calculations, alarming functions, and other control functions commonly implemented within the controller. The process controllers, which may or may not be located within the plant or field environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices by utilizing 4-20 mA analog signals, HART®, WirelessHART®, HART-IP®, FOUNDATION Fieldbus, Next-Gen-compatible, Advanced Physical Layer (APL)-compatible, and/or other industrial communication protocols. The control modules in the controller send the control signals over the communication lines or links to the field devices to thereby control the operation of at least a portion of the process plant or system, e.g., to control at least a portion of one or more industrial processes running or executing within the plant or system. For example, the controllers and the field devices control at least a portion of a process being controlled by the process plant or system. I/O devices, which are also typically located within the plant environment, typically are disposed between a controller and one or more field devices, and enable communications there between, e.g., by converting electrical signals into digital values and vice versa. As utilized herein, field devices, controllers, and I/O devices are generally referred to as "process control devices," and are generally located, disposed, or installed in a field environment of a process control system or plant.

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher field environment of the plant, e.g., in a back-end environment of the process plant. Each of these hardware devices typically is centralized across the process plant or across a portion of the process plant. These hardware devices run applications that may, for example, enable an operator to perform user functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, a distributed process control system (DCS) may include multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which may be objects in an object-oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Lockout-tagout (LOTO) procedures are used across industries as a safe method of working on hazardous equipment (e.g., field devices in process plants), and are mandated by law in some countries (e.g., OSHA 1910.147 in the United States). Many types of equipment may jeopardize the safety of plant personnel if the equipment is energized or operating while the equipment is being serviced by maintenance personnel. LOTO procedures ensure that equipment is properly shut off or otherwise isolated and not able to be started up again prior to the completion of maintenance or repair work, and requires that equipment be "isolated and rendered inoperative" before work is started on the equipment in question. In a typical scenario, a worker or plant personnel isolates and renders inoperative a specific piece of equipment or device with respect to the process control system, and uses a physical lock to lock the piece of equipment or device. FIG. 1 illustrates an example of a physical lock 10a as may be used in traditional LOTO procedures. A worker, such as a maintenance technician, places a physical tag 12a on the physical lock 10a, where the physical tag 12a identifies the worker who placed the lock 10a on the equipment. The worker holds the key for the physical lock 10a, ensuring that only he or she can remove the lock 10a, re-connect, and re-start the equipment. While the piece of equipment or device is locked, anyone else who desires to access the locked piece of equipment is able to identify the locking worker via the tag 12a, and may contact him or her to discuss and coordinate access to the piece of equipment. Accordingly, the LOTO procedure prevents workers and the remainder of the operating process control system from accidentally starting up or controlling process plant equipment while the equipment is in a hazardous state or while another worker is in direct contact with the equipment, e.g., for maintenance or repair purposes. Of particular note in FIG. 1, three different workers have placed respective locks 10a, 10b, 10c and tags 12a, 12b, 12c on the same piece of equipment, and as such, all three workers would need to be contacted in order to coordinate the complete unlocking of the locked equipment.

Generally speaking, present day LOTO procedures include a worker or plant personnel first announcing that a target device or piece of equipment is about to be serviced, and then isolating the target equipment by physically locking the target equipment so that it cannot be energized, accessed, or operated by other parties, and so that it cannot communicate with (and be functionally responsive to commands from) the process control system. Present day LOTO procedures also include physically tagging the equipment with the identity of the locking party so that the locking party can be identified (e.g., should access to the equipment need to be coordinated), and proving that the equipment is isolated from the system and safe to work on. Typically, using present day LOTO procedures, a worker mechanically isolates and secures the equipment using a padlock in conjunction with an affixed physical tag indicating who locked-out the equipment, e.g., as shown in FIG. 1. For instance, the tag may include a label or may be written on to indicate the person who placed the tag on the lock. Generally speaking, the person who places the lock and tag on the equipment "owns" the padlock and maintains possession of its key (or its unlocking combination). In some situations, present day LOTO procedures allow multiple locks and tags to be utilized on a single piece of equipment, where each lock/tag corresponds to a different locking party, e.g., as shown in FIG. 1.

However, there are many drawbacks to present day LOTO procedures. For example, in order to place a physical lock on a piece of equipment, or subsequently remove the lock from the equipment, a worker needs to physically access the equipment in the plant, which can be inconvenient as well as dangerous. For instance, the target equipment which is to be locked may be located in an area of the plant which is difficult for workers to physically access, such as high up on a rack or near the ceiling, underground, or surrounded by other, densely packed equipment.

Further, when another worker needs to access the equipment, the owner of the key or combination to the physical lock may have lost the key or forgotten the combination, or the owner of the physical lock may be unavailable (e.g., left the company, on vacation, out of the country, etc.). In such cases, the other worker must use a bolt cutter to enable the locked-out equipment (i.e., by breaking the lock). Physically cutting the lock may be moderately difficult, and workers who use the bolt cutter may be dismissed for violating company safety policies/requirements if proper procedures have not been followed. For instance, if the worker who placed the lock is off shift, best practices involve calling the worker back to the job site to remove their lock, rather than using a bolt cutter to remove the lock.

Still further, with the advances in process control systems and protocols, ownership of a piece of equipment is no longer limited to either only the process control system (e.g., for run-time process control operations) or proximate human personnel and their respective maintenance devices (e.g., for maintenance operations). For example, historically, a field device which communicated with a process controller using a 4-20 mA loop could be under the ownership or purview of either the process controller or a handheld maintenance device operated by maintenance personnel, each of which communicatively connected to the field device via a different physical communication link. As such, historically, the ownership and locking of the field device corresponded to a specific physical communication link utilized by the field device. Today, though, a field device may be communicatively connected to a process controller (and in some cases, to other devices or components of the process control system, e.g., network controllers, gateways, HART-IP devices, etc., and/or to maintenance devices) via one or more communication links supporting various different types of protocols, such as wired HART, WirelessHART, HART-IP, and/or other packet protocols, for example. Moreover, many components of the process control system and maintenance devices which utilize these different protocols to access and communicate with the field device (e.g., network controllers, gateways, HART-IP devices, etc.) may support numerous clients above the physical communication layer, where each client possibly may "own" or control the field device during normal plant operations and/or during other operational, run-time procedures relating to the field device. Thus, instead of a one-to-one correspondence between owners of the field device and physical communication links, it is now possible to have many owners of the field device which utilize a same physical communication link, and it is possible to have a particular owner which communicates with the field device using different communication links. Consequently, using the traditional LOTO procedures to lock the field device to a particular, physical communication link does not provide adequate protection, at least because each physical communication link of the field device no longer has a one-to-one relationship with an owning party, and therefore isolation of the field device is not ensured.

SUMMARY

Techniques, systems, apparatuses, components, devices, and methods for digitally safety locking party devices and equipment are disclosed herein. Said techniques, systems, apparatuses, components, devices, and methods may apply to industrial process control systems, environments, and/or plants, which are interchangeably referred to herein as "industrial process," "process control," or "process" systems, environments, and/or plants. Typically, such systems and plants provide control, in a distributed manner, of one or more processes (also referred to herein as "industrial processes") that operate to manufacture, refine, or transform, raw physical materials to generate or produce products.

The present disclosure provides embodiments of systems and methods of using a digital safety lock that provides secure (e.g., isolated) dedicated access to and/or dedicated control of industrial process plant devices and equipment in a multi-client environment. The digital safety lock is a feature which may be used in or with devices, instrumentation, or equipment of an industrial process plant that is operated via software control (e.g., a field device, such as a valve, actuator, variable speed drive, etc.). When the digital safety lock is activated or asserted, the subject device is secured into a mode which is supported by the device and which limits the operations of the device (e.g., limited to performing maintenance only, isolated from run-time process control system operations, etc.). A digital safety lock may be included in a subject device (e.g., may be downloaded into or otherwise configured into the device), or a digital safety lock may be applied to and/or associated with a subject device. Generally speaking, digital safety locks may be applied to and/or included in any device of a process control system which includes at least one processor, at least one memory, and one or more communication links via which the device is communicatively connected to other components of the process control system. However, for clarity of illustration and discussion herein, and not for limitation purposes, this disclosure discusses techniques of digital safety locks as being applied to and/or included in a field device which is controlled by a process controller and which is functionally operable, during run-time, to perform one or more physical functions based at least in part on commands, instructions, or control signals received from the process controller. That is, the field device is functionally operable when the field device is functionally responsive (e.g., by moving, manipulating, activating, etc. physical components and/or by executing process control business logic stored at the field device) to commands, instructions, or control signals received from the process controller (and optionally other devices, such as process control system diagnostic devices). As such, a field device may be operable while the field device is not functionally operable. For example, a field device which is operable but is not functionally operable may be able to send and receive communications to/from other devices, but otherwise does not responsively move, manipulate, activate, etc. its physical components and does not responsively execute its business logic.

Generally speaking, a digital safety lock may include three parts: an indication of an identification of a locking party, an indication of a digital safety lock key corresponding to the locking party, and an indication of a mode or state of the field device associated with digital locking and unlocking, which is generally referred to herein as an "(un)locking" mode or state of the field device. The parts of the digital safety lock may be stored in one or more memories which are accessible to the processor(s) of the field device, for example. The locking party is an "owner" of the digital safety lock, and thus has control of the field device so that the device is functionally responsive to instructions issued by the locking party. The locking party may be indicated or identified at the digital safety lock by a specific alphanumeric identifier, and typically, the identification of the locking party is publicly available. That is, any other party (a human/user or a device, machine, or application) may obtain (e.g., read) the identification of the locking party from the digital safety lock. The locking party may be able to activate and deactivate the digital safety lock by using the locking party's digital safety lock key. Examples of possible locking parties or owners include individual human beings (e.g., a process control system operator, a maintenance technician, etc.), a device (e.g., a process control system device, a handheld maintenance device, etc.), an application (e.g., an executing process control system application, an executing maintenance application, etc.), or an authorized group (e.g., all personnel in department X during shift Y, etc.), to name a few.

The digital safety lock key may take the form of a numerical and/or alphanumeric string of, for example, a specified minimum length, a minimum level of entropy, etc. In some examples, the digital safety lock key may additionally or alternatively include a certificate generated by a certificate authority, where the certificate may be managed and revoked using certificate management methods. In any case, the digital safety lock key is typically known to only its owner (and perhaps, in some situations, to an IT administrator, certificate authority, or other authorized administrative party). For example, when the digital safety lock key includes a numerical and/or alphanumeric string, the minimum length of the digital safety lock key may be a minimum number of alphanumeric characters, and the minimum level of entropy may correspond to required presences and/or variations in digits, letters, punctuation, other special characters, etc. In some embodiments, one or more digital safety lock keys may be automatically generated, e.g., based on the locking party identification and/or on other parameters. Each digital safety lock key may be uniquely associated with a respective owner or locking party, in embodiments. Further, the digital safety lock key of the digital safety lock may be utilized in a manner similar to that of a physical key or a combination key of a padlock. In particular, users or parties (i.e., such as the locking party, another party authorized by the locking party, or software applications used at the direction of either of these parties) may use their respective digital safety lock key to lock the digital safety lock, thereby activating the digital safety lock in association with the locking party, and thereby placing the field device into a locked mode. Similarly, users or parties may use their respective digital safety lock key to unlock the digital safety lock, thereby deactivating the digital safety lock in association with the locking party. Generally speaking, it is not possible for any user or party to activate or deactivate a digital safety lock without the party's digital safety lock key.

At any time, a field device may be in one of at least four different (un)locking states or modes, such as the locking state, the locked state, the unlocking state, and the unlocked state. The locking state is a transitional state indicating that the field device is in the process of being locked, e.g., by the activation of a digital safety lock. For example, the field device may be considered to be in the locking state while the identification of the locking party, the indication of the locking party's digital safety lock key, and the indication of the locked state are being written to (e.g., stored or recorded at, or stored/recorded in conjunction with) a digital safety lock of the field device.

While the device is in a locked mode or state, the subject equipment or device is isolated and rendered functionally inoperative or functionally unresponsive to parties other than the locking party. For instance, a device in a locked mode or state may be functionally unresponsive to commands or instructions issued by devices other than devices that provide indications of respective digital safety lock keys of one or more locking parties that activated one or more digital safety locks at the field device, where such devices may include devices associated with, utilized by, or otherwise authorized by the locking party such as, for example, a device utilized by a human locking party or a device on which an application that is a locking party executes. However, for the device in the locked mode, the identification of the locking party is freely available, i.e., such that any user or other party attempting to access or gain control of the subject equipment at any time can read or otherwise easily obtain, from the activated digital safety lock or field device, an indication of the party who owns the activated digital safety lock. For example, when the device is in the locked state, the memory or data storage area of the digital safety lock in which an indication of the identification of the locking party, an indication of the locking party's digital safety lock key, and the indication of the locked state are stored is "read-only" or "write-protect enabled." Generally speaking, the device is considered to be in a locked mode or state when the device is secured by one or more activated digital safety locks.

In some cases, the identification of the locking party stored at or in conjunction with the digital safety lock may include or provide a reference to contact information of the locking party, so that users or parties attempting to access the subject device can contact the locking party and, for example, request confirmation that the locking party desires the equipment or device to remain locked, request the locking party to unlock the digital safety lock, request the locking party to provide the digital safety lock key so that the requesting party is able to unlock the digital safety lock, coordinate unlocking and access to the field device, etc. These techniques are somewhat similar to a traditional LOTO procedure in which the physical tag identifies the owner of the physical key that unlocks a padlock. Advantageously, however, with the digital safety lock, there is no need for the locking party, or any other user, to physically place a padlock on a piece of equipment or use a physical key to remove the padlock from the equipment, or even for the locking party to be physically present on-site, in most scenarios.

Instead, with digital safety locks, physically accessing the locked equipment is only required as a last-resort means of recovery (i.e., analogous to the bolt cutter in traditional LOTO procedures), for example, in the event that the locking party cannot be reached to unlock the digital safety lock or provide the digital safety lock key so that another user or party can do so. For instance, recovery steps may include manual and/or physical means (for example, a physical switch that may be actuated, a physical key, etc.) that, when combined with cycling power on the device, allow the digital safety lock to be removed and/or deactivated. That is, manually removing or deactivating a digital safety lock may require a user (e.g., a worker) to physically access the device and confirm that the safety of the device will not be affected by removing the digital safety lock, and is a moderately painful step that would inhibit frequent recovery of the digital safety lock.

The unlocking state is a transitional state indicating that the device is in the process of being unlocked. For example, the device may be considered to be in the unlocking state while the stored locking party's digital safety lock key (and optionally the identification of the locking party) are being respectively compared to the digital safety lock key (and optionally an identification of the locking party) provided by the unlocking party, while the identification of the locking party and the locking party's digital safety lock key are being cleared or removed from the digital safety lock, and while the indication of the (un)locking state is being changed to the unlocked state.

When the device is in the unlocked state or mode with respect to digital safety locks, the indication of the owner of the digital safety lock and associated digital safety lock key are set to NULL at the digital safety lock of the device, thereby indicating that the device does not have any owner. In the unlocked state or mode, the device is available for use and the (un)locking state may be freely changed, e.g., per human or machine-provided instructions. For example, when the device is in the unlocked state, the memory or data storage area of the digital safety lock in which the identification of the locking party, the locking party's digital safety lock key, and the indication of the locked state are stored is "write-protect disabled."

In an embodiment, a method at a field device of an industrial process plant includes receiving, by a field device in a locked mode and having a digital safety lock that is activated, a request of a maintenance device to perform a maintenance activity associated with the field device. The field device is functionally operable during run-time of a process control system to perform physical actions responsive to control signals to thereby control an industrial process, and the locked mode is indicative of the field device being functionally unresponsive to instructions issued by devices other than devices that provide indications of respective digital safety lock keys of one or more locking parties that activated one or more digital safety locks at the field device. The method additionally includes sending, by the field device to the maintenance device, an indication of a locking party included in the one or more locking parties; and, responsive to the sent indication of the locking party, receiving, by the field device, an indication of a digital safety lock key. Further, the method includes deactivating, by the field device, a digital safety lock activated by the locking party at field device when the received digital safety lock key corresponds to an actual digital safety lock key corresponding to the locking party.

In an embodiment, a method at a requesting device associated with an industrial process plant includes sending, by the requesting device, a request to control a field device that is operable during run-time of a process control system to perform physical actions responsive to control signals to thereby control an industrial process. The field device is in a locked mode indicative of the field device being functionally unresponsive to instructions issued by devices other than devices that provide indications of respective digital safety lock keys of one or more locking parties that activated one or more digital safety locks at the field device utilized by a locking party that activated the digital safety lock. Additionally, the method includes receiving, at the requesting device and responsive to the sent control request, (i) an indication that the field device is in a locked mode, and (ii) an indication of a locking party. Further, the method includes causing, by the requesting device, a digital safety lock key corresponding to the locking party to be transmitted to the field device; and obtaining control of the field device based on the transmitted digital safety lock key corresponding to the locking party.

In an embodiment, a method includes receiving, by a first device in a locked mode and having a digital safety lock that is activated, a request of a second device to access or control the first device. The locked mode is indicative of the first device being functionally unresponsive to instructions issued by devices other than devices that provide indications of respective digital safety lock keys of one or more locking parties that activated one or more digital safety locks at the first device. The method also includes sending, by the first device to the second device, an indication of a locking party included in the one or more locking parties; and, responsive to the sent indication of the locking party, receiving, by the first device, an indication of a digital safety lock key. Additionally, the method includes deactivating, by the first device, a digital safety lock activated by the locking party at the first device when the received digital safety lock key corresponds to an actual digital safety lock key corresponding to the locking party.

DETAILED DESCRIPTION

As discussed above, devices or equipment in a process plant, process control system, or process control environment that operates to control one or more industrial processes in real-time may be digitally safety locked (e.g., secured) and unlocked (e.g., unsecured) by utilizing one or more of the novel digital safety locking and unlocking techniques, systems, apparatuses, components, devices, and/or methods described herein. The process plant includes one or more wired and/or wireless process control devices, components, or elements that perform respective physical functions in concert with a process control system to control one or more industrial processes executing within the process plant, where any of the devices, components, and/or elements may be subject to digital safety locking and digital safety unlocking. The process plant and/or process control system may also include, for example, one or more wired communication networks and/or one or more wireless communication networks. Additionally, the process plant or control system may include centralized databases, such as continuous, batch, asset management, historian, and other types of databases.

Figure 1:
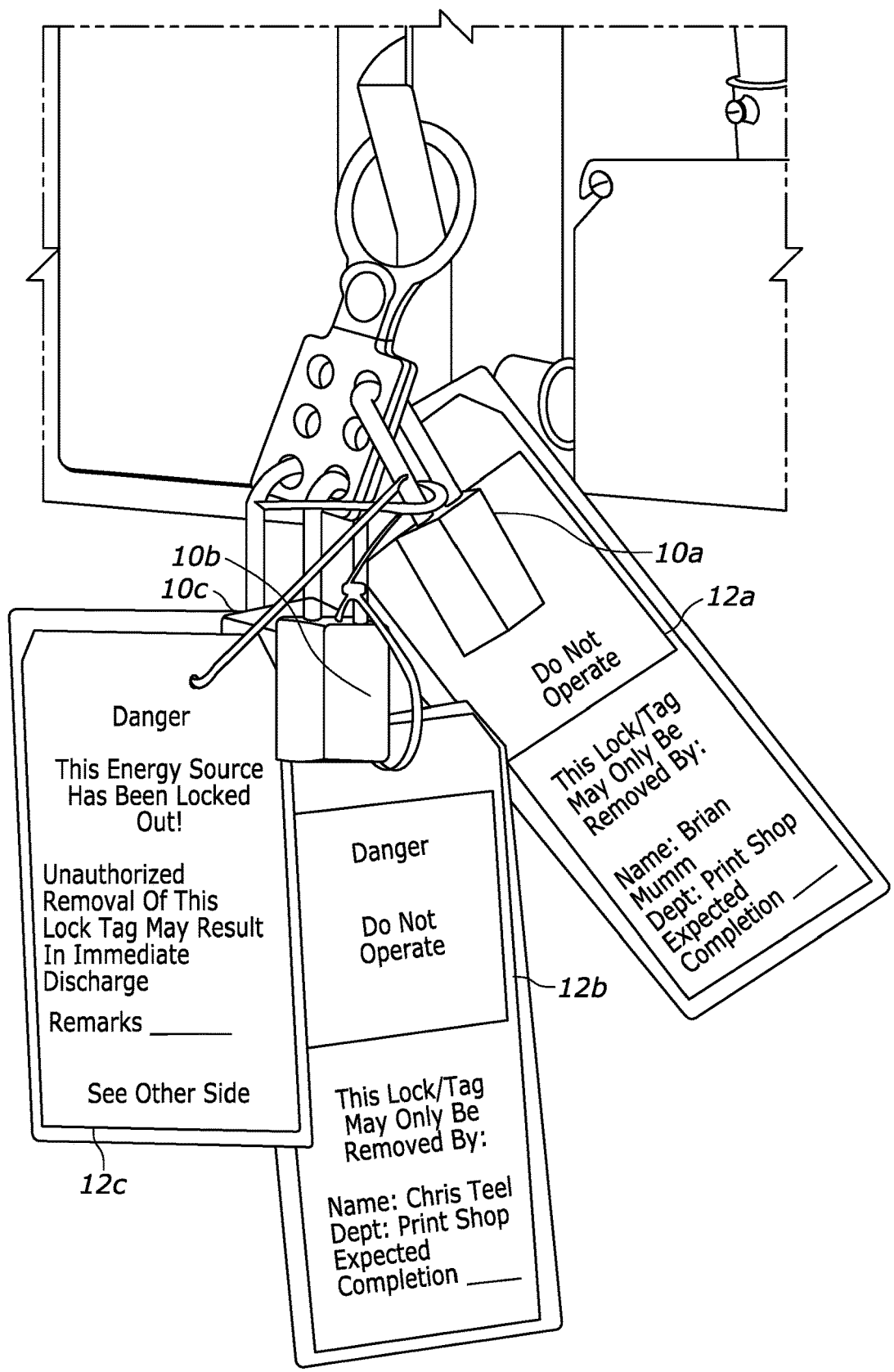
FIG. 1 illustrates an example of physical padlocks being used in traditional lockout-tagout (LOTO) procedures.
Figure 2A:
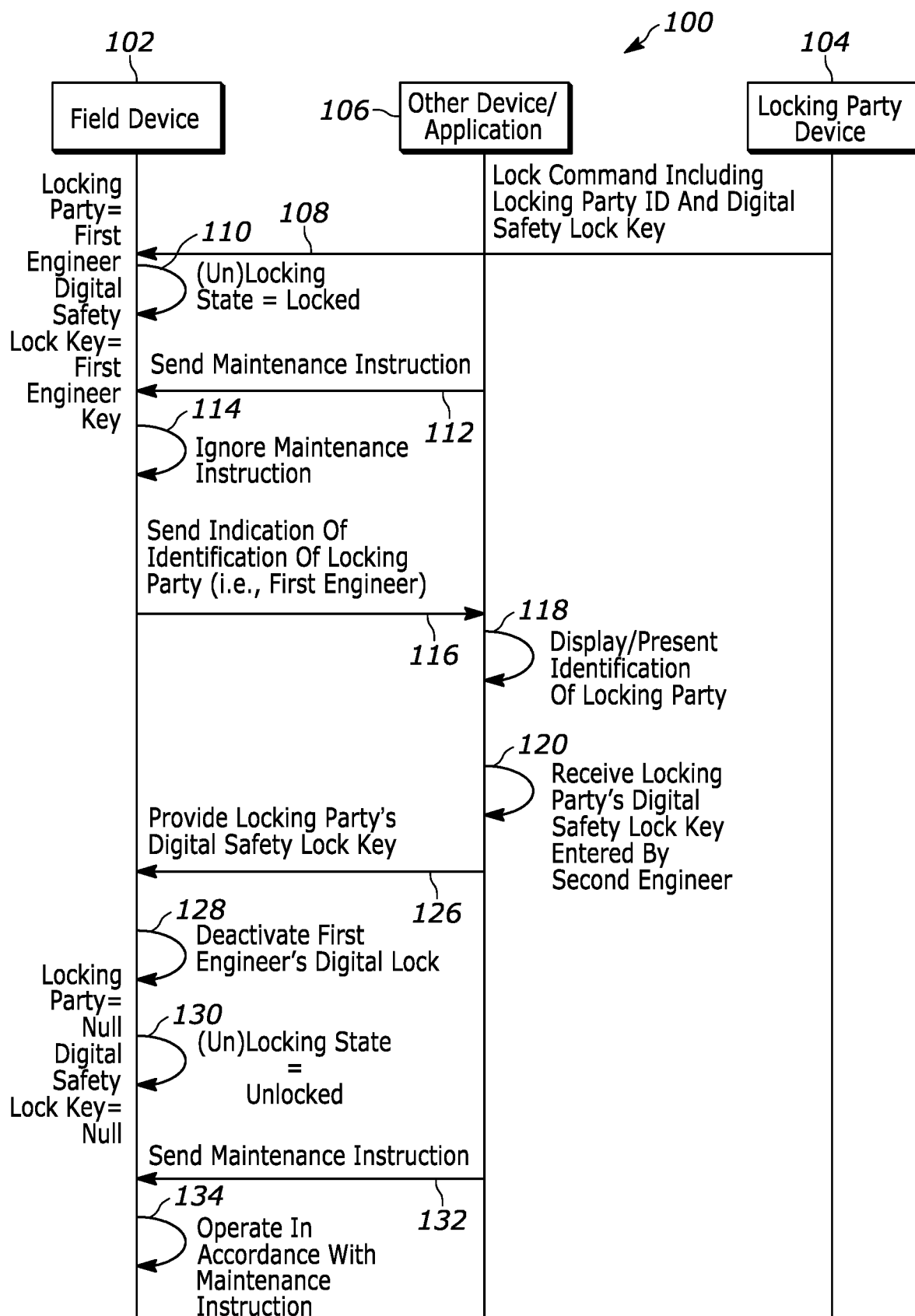
FIGS. 2A and 2B depict signal diagrams associated with exemplary communication flows for devices involved in the digital safety locking and unlocking of devices and equipment of an industrial process plant.
Figure 2B:
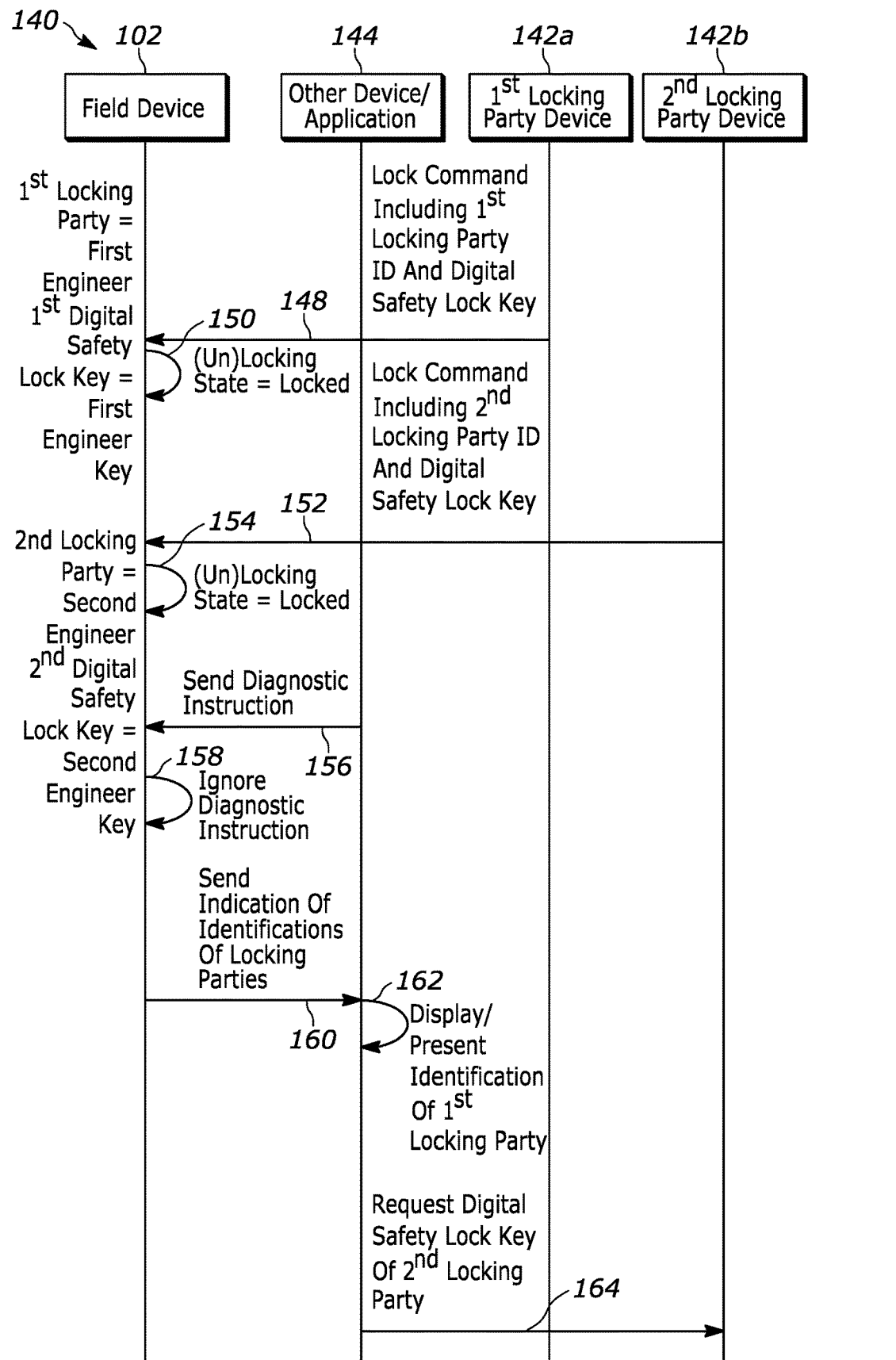
Figure 2B:
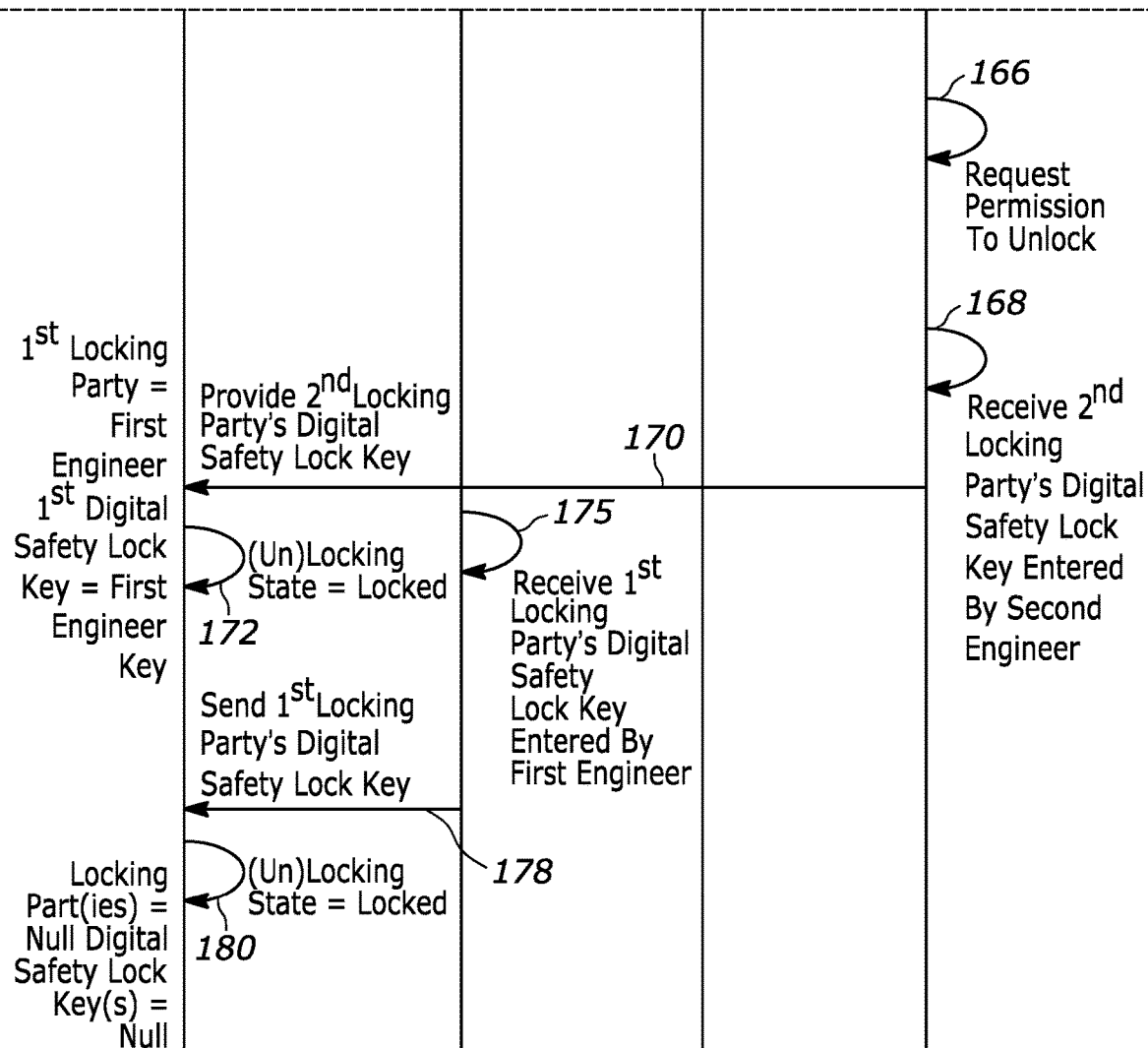

FIGS. 2A and 2B depict signal diagrams associated with exemplary communication flows for devices involved in digital safety locking and unlocking of devices and equipment of an industrial process plant.

Turning first to FIG. 2A, the exemplary communication flow 100 illustrates example communications between a field device 102, a locking party device 104, and another device 106, where the devices 102, 104, 106 are communicatively connected by one or more networks (e.g., network 208 described in greater detail below with respect to FIG. 3) and/or communication links of an industrial process plant. The field device 102 is configured with a digital safety lock which, as previously discussed, may include an indication of the (un)locking mode or state of the field device, an indication of a locking party associated with the digital safety lock (if any), and an indication of a digital safety lock key (if any) associated with the locking party. For example, a memory of the field device may include locations in which to store the (un)locking mode/state of the field device, the respective identification of one or more locking parties, and the identification of one or more digital safety lock keys respectively corresponding to the one or more locking parties.

In the communication flow 100, the locking party device 104 provides (reference 108), to the field device 102, a lock command including an indication of the identification of the locking party and a digital safety lock key corresponding to the locking party. The locking party device 104 may be, for example, a maintenance device or tool, or the locking party device 104 may be a process control system device or tool.

In embodiments in which the locking party device 104 is a maintenance device, the device 104 may be, for example, a field device maintenance tool, a multi-meter, a portable loop power supply, or a field device configuration tool, to name a few, and may or may not be a handheld device. The maintenance device 104 may be intermittently communicatively connected to the field device 102. For example, the maintenance device 104 may communicatively connect to the field device 102 in a direct manner (e.g., via a wired or wireless communication terminal or port of the field device 102), and in some cases may provide power to the field device 102 and/or to a wire loop to which the field device 102 is connected. In another example, the maintenance device 104 may communicatively connect to the field device 102 in a remote manner, e.g., via one or more wired and/or wireless communication networks, links, buses, access points, etc., which may include a communication link via which the field device transmits and receives run-time process control commands and data (such as a HART loop or a Fieldbus segment), and/or which may include an access point connecting the field device 102 to a process control system gateway, for example. Generally speaking, the maintenance device 104 enables a user (e.g., maintenance technicians and other maintenance personnel) to communicate with, configure, perform maintenance activities on, and/or diagnose the field device 102 when the field device 102 is installed in the plant. That is, maintenance personnel may utilize the maintenance device 104 for configuring, supporting, and maintaining field devices. As such, the locking party device 104 shown in FIG. 2A may be, for example, a field device communicator which may be used to support process measurement field devices, such as pressure sensors, temperature sensors, level sensors, flow analytical sensors, flow meters, valve positioners, etc. However, in other scenarios or embodiments, a maintenance device (e.g., device 104) could be used to support, connect to, maintain, communicate with, or otherwise be used with other types of devices (e.g., device 102) including, for example, rotating equipment, vibration detection and analysis equipment, power generating equipment, switches, motors, pumps, compressors, drives, mechanical vessels, such as tanks, pipes, etc., electrical power distribution devices, switch gear, motor control centers any other stand-alone equipment (e.g., equipment not communicatively connected to a process controller, for example), or any other types of industrial equipment. In these cases, the maintenance device 104 could have various different types of communication and electrical generation and detection hardware (e.g., voltage, current, impedance, etc. generation and detection equipment) to perform maintenance on, configuration of, and/or communication with these other types 102 of industrial equipment.

In embodiments in which the locking party device 104 is a process control system device, the device 104 may be, for example, a process controller, a safety controller, a process control system host, server, or other computing device (e.g., at which diagnostics are initiated and executed as part of the process control system), and/or any other device which is included in the process control system and which executes one or more applications thereon during run-time of the process control system and communicates with the field device 102. For example, a locking party device 104 which is a remote diagnostic device may be disposed in a back-end environment of the industrial process plant (such as the back-end environment 304 of FIG. 4), and a locking party device 104 which is a process controller may be disposed in the back-end environment of the industrial process plant or in a field environment of the industrial process plant (such as the field environment 302 of FIG. 4).

At any rate, the locking party associated with the locking party device 104 may be a person or group of people such as maintenance personnel, department, shift, etc. operating the local or remote maintenance device, or such as one or more operators monitoring the run-time of the process control system via a workstation or remote operator interface device. In some scenarios, the locking party may be an application executing within the process control system on a component or device of the process control system (e.g., a control application, analytics application, diagnostics application, maintenance application, user interface application, configuration application, etc.). As such, the identification of the locking party may include, for example, a name of a person, an identification number associated with the person, contact information associated with the person (such as an email address, phone number, chat ID, etc.) or reference(s) thereto, a process control system tag indicative of a device or application, an application or process identifier, etc. In some situations, the locking party may be a shift leader or a department, i.e., rather than an individual, and the indication of the identification of the locking party may be an indication of the identification of the shift or department. In some situations, such as when the locking party is a process control system application, the identification of the locking party may include a process control system device tag or signal tag, an application identifier, and/or a reference to contact information for operating personnel who are currently on shift in the area in which the subject field device 102 is disposed. The locking party may have provided an indication of its identification and a digital safety lock key to the locking party device 104 (e.g., via entry at a user interface, a file, a message, etc.). In some embodiments, the locking party provides an indication of its identification to the locking party device 104, and the locking party device 104 automatically determines the digital safety lock key of locking party based on the provided locking party identification, e.g., by accessing a database, by executing an algorithm, etc.

As shown in FIG. 2A, the locking party device 104 provides the indication of the locking party identification and the digital safety lock key (or indication thereof) to the field device 102 (reference 108) in conjunction with a command or instruction to lock the field device 102 on behalf of the locking party, e.g., to activate a digital safety lock at the field device 102. In other embodiments, though, the lock command, the locking party identification, and the digital safety lock key corresponding to the locking party may be sent to the field device 102 using multiple transmissions. At the field device 102, upon receiving the indication of the locking party identification, the digital safety lock key corresponding to the locking party, and the command to digitally safety lock the field device 102, the field device 102 may activate the digital safety lock, so that the field device 102 enters into a "locked" mode 110 with respect to digital (un)locking and so that the field device 102 stores, in a local or otherwise accessible memory, the indication of the locking party and the corresponding or actual digital safety lock key of the locking party (e.g., as shown in FIG. 2A, "first engineer" and "first engineer key," respectively). In some situations, the field device 102 may receive multiple locking requests from multiple locking party devices 104, or from multiple users or parties who use the same locking party device 104, each with their respective identification and respective digital safety lock key. In these situations, the field device 102 may activate multiple digital safety locks, locally store the respective identifications and respective, actual digital safety lock keys, and remain in a "locked" mode or state so long as any of the multiple digital safety locks remains active.

As the digital safety lock is activated, thus placing the field device 102 in the locked mode or state 110, the field device 102 is isolated or prevented from functionally responding to other devices or applications 108 (e.g., other maintenance devices, process control devices, process control applications, etc.) which are not under the control or direction of the locking party. For ease of illustration, and not for limitation purposes, consider an example scenario depicted by FIG. 2A in which the locking party is a first maintenance engineer, the locking party device 104 is a first maintenance tool utilized by the first maintenance engineer, and the other device/application 106 is a second maintenance tool (e.g., on which a maintenance application may be executing) which is utilized by a second maintenance engineer. The second maintenance engineer may utilize the second maintenance device 106 to send (reference 112) a maintenance instruction to the field device 102 while, unbeknownst to the second maintenance engineer, the field device 102 is in the locked mode 110, e.g., after the locking party device 104 has caused the digital safety lock to be activated. For example, the maintenance instruction 112 may be an instruction to gain control of the field device 102 for a maintenance procedure of the second maintenance device 106, or similar. As the field device 102 is in the locked state, the field device 102 may ignore or otherwise not follow the maintenance instruction (reference 114), i.e., by dropping the instruction, by not allowing a maintenance override by the second maintenance device 106, etc. That is, because the field device 102 locked due to the activated digital safety lock, the field device 102 does not substantively or functionally respond (reference 114) to communications received from any party or device other than those associated with the locking party and/or the locking party device 104.

Additionally, the field device 102 may send, to the maintenance device 106 (reference 116), an indication of the identification of the locking party associated with the activated digital safety lock. (When the field device 102 is subject to multiple digital safety locks, the field device 102 may send indications of multiple, respective locking party identifications to the second maintenance device 106.) The indication of the identification of the locking party may include, for example, a name of a person, an identification number associated with the person, contact information associated with the person (such as an email address, phone number, etc.), a process control system tag indicative of a device or application, an application or process identifier, etc. or respective reference(s) thereto.

The second maintenance device 106 may display or otherwise present (reference 118) the indication of the identification of the locking party at a user interface of the second maintenance device 106, or may otherwise inform the second maintenance engineer or user of the maintenance device 106 of the identification of the locking party. As such, the locking party (e.g., the first engineer) is identified to the second engineer operating the second maintenance device 106, and the second engineer is able to speak to or otherwise dialogue with the first engineer controlling the locking party device 104 (e.g., in person, via phone, or electronically) to request that the first engineer either unlock the field device 102 or provide, to the second engineer, the appropriate digital safety lock key for unlocking the field device 102 so that the second engineer can perform desired maintenance on the field device 102. In the example scenario depicted in FIG. 2A, the first maintenance engineer agrees to the second maintenance engineer's request and provides the digital safety lock key to the second maintenance engineer, who, in turn, may enter the digital safety lock key at the second maintenance device 106 (reference 120), e.g., via a user interface of the second maintenance device 106. Subsequently, the second maintenance device 106 provides (reference 126) the first engineer's digital safety lock key (which optionally may include the indication of the identification of the first engineer or locking party) to the field device 102 for deactivating the digital safety lock applied thereto.

At the field device 102, upon confirming that the received digital safety lock key and the actual digital safety lock key of the locking party are in accordance (e.g., that the two keys match to an exact or a certain degree), and upon confirming that the identification of the locking party and the received digital safety lock key correspond to each other (e.g., by accessing the field device's local memory), the field device 102 may remove or deactivate the digital safety lock which was utilized by the first engineer to secure the field device 102, including clearing the indication of the identification of the first engineer as the locking party and clearing its associated digital safety lock key from the memory of the field device 102 (reference 128). If no other digital safety locks are applied to (e.g., or activated at) the field device 102, the field device 102 may enter into a "normal" or "unlocked" state or mode with respect to digital safety locks, as shown by reference 130 in FIG. 2A. Alternatively, the field device 102 may remain in a "locked" state if other digital safety locks have been applied thereto, or the field device 102 may remain in a "locked" state if required by the second maintenance device 106 for its respective maintenance purposes (not shown in FIG. 2A). In this latter alternative, the indication of the identity of the second maintenance engineer and the digital safety lock key corresponding to the second maintenance engineer may be stored locally at the field device 102 in conjunction with the locked state. In the example scenario shown in FIG. 2A, however, the maintenance which the second engineer desires to perform via the second maintenance tool 106 does not require the field device 102 to be locked, and as such, the field device 102 transitions into the "unlocked" state with respect to digital safety locks (reference 130).

Accordingly, as the field device 102 is in the unlocked state, the second maintenance device 106 may send (reference 132) a maintenance instruction to the field device 102, and the field device 102 may functionally operate or respond (reference 134) in accordance with the maintenance instruction. Furthermore, as the field device 102 is operating in the unlocked state or mode 130 (e.g., corresponding to the deactivated digital safety lock), the field device 102 may subsequently again be locked by, e.g., by the locking party via the locking party device 104 or by any other party and suitable device, at a later time as needed.

FIG. 2B depicts a signal diagram of an exemplary communication flow 140 for devices involved in the digital safety locking and unlocking of a target or subject device of an industrial process plant. Similar to the example communication flow 100 described above with respect to FIG. 2A, the communication flow 140 illustrates communications between the field device 102, a first locking party device 142a, a second locking party device 142b, and another device or application executing on a process control system device 144, where the devices/applications 102, 142a, 142b, 144 are communicatively connected by one or more networks (such as, e.g., the network 208, described in greater detail with respect to FIG. 3 below) or communication links. As discussed above with respect to FIG. 2A, the field device 102 is configured with a digital safety lock which may include an indication of an (un)locking mode or state of the field device 102, an indication of a locking party (if any), and an indication of a digital safety lock key (if any) corresponding to the locking party. For example, a memory of the field device may include locations in which to store the (un)locking mode/state of the field device with respect to the digital safety lock, the respective identification of one or more locking parties, and the one or more digital safety lock keys respectively corresponding to the one or more locking parties.

In the example communication flow 140, a first maintenance engineer is operating the first locking party device 142a, and desires to lock the field device 102 so that his or her team can safely execute a plurality of maintenance actions and/or maintenance applications. The first locking party device 142a operated by the first maintenance engineer may be, for example, a local workstation, a handheld maintenance device, or a remote device executing a remote user interface application. The first maintenance engineer requests, via the locking party device 142a, to lock the field device 102, thereby causing the locking party device 142a to transmit (reference 148), to the field device 102, a lock command including an indication of the identification of the first engineer as the locking party and the digital safety lock key corresponding to the first engineer (or indication thereof). Accordingly, the field device 102 activates a first digital safety lock, locally stores or records the first engineer as the locking party and the digital safety lock key corresponding to the first engineer, and enters into the locked state with respect to the digital safety lock (reference 150).

Subsequently, a second maintenance engineer on the first maintenance engineer's team initiates a maintenance application (e.g., one of the maintenance actions/applications which the team is to execute) via a second locking party device 142*b*, which may be, for example, a handheld maintenance device or a remote computing device on which the maintenance application executes. The maintenance application executing on the second locking party device 142*b* transmits (reference 152) a lock command including an indication of the locking party as being the second maintenance engineer, and a digital safety lock key corresponding to the second maintenance engineer. The field device 102 activates a second digital safety lock, including locally storing the second engineer as the second locking party in conjunction with storing the second engineer's digital safety lock key, and remains in the locked state with respect to digital safety locks (reference 154). Thus, at the point in the example scenario, the field device 102 is subject to two activated digital safety locks. Other team members may similarly apply and activate respective digital safety locks, if desired (not shown).

Next, in the example communication flow 140, a periodically-scheduled, standard diagnostic application of the runtime process control system automatically executes, e.g., at a computing device 144 of the process control system, and sends (reference 156) a diagnostic instruction to the field device 102 while the field device 102 is in the locked mode. For example, the diagnostic instruction may include an instruction to gain control of the field device 102 for executing the diagnostic procedure, or similar. However, as the field device 102 is in the locked state, the field device 102 may ignore the instructions of or otherwise not substantively or functionally respond to the diagnostic instruction (reference 158), for example, by dropping the instruction, not allowing a diagnostic override of the field device 102 by the diagnostic application executing at the process control system device 144, etc. That is, because the field device 102 is in a locked state with respect to digital safety locks, the field device 102 does not substantively or functionally respond (reference 158) to commands or instructions received from any party or device other than the locking parties 142*a*, 142*b*. However, as shown in FIG. 2B, the field device 102 may send (reference 160), to the executing diagnostic application 144, an indication of the identification of locking parties associated with the activated digital safety locks (e.g., the first engineer and the second engineer).

Upon receiving the identification of the locking parties 156, the diagnostic application executing at the process control system 144 may cause the identification of one or more of the locking parties 156 to be presented at a user interface corresponding to the executing diagnostic application (e.g., at a process control system operator workstation, remote operator work station interface, or similar), e.g., so that an operator or other personnel may contact the locking parties to discuss unlocking the field device 102 and possibly obtaining in the corresponding digital safety lock keys, e.g., in a manner similar to that illustrated in FIG. 2A. Specifically, in FIG. 2B, the identification of the first locking party (corresponding to the first digital safety lock activated at the field device 102) is presented at a user interface of the process control system (reference 162) such as an operator workstation, e.g., as the first locking party is the overall coordinator of the teams' subsequently-applied, respective digital safety locks.

On the other hand, with respect to the second digital safety lock, the diagnostic application (or the process control computing device 144 on which the diagnostic application is executing) may automatically (or based on instructions provided by an operator of the process control system via a user interface) request (reference 164) that the locking party device 142*b* electronically and automatically provides the second digital safety lock key to the field device 102. The second locking party device 142*b*, upon receiving the request 164, may provide the request to the maintenance application executing thereon (e.g., to the second locking party), and the maintenance application, at a suitable time during its execution, may cause a prompt to be displayed on a user interface associated with the second locking party device 142*b*, where the prompt includes a request for permission to unlock the field device 102. For example, the displayed prompt may indicate the requesting party (in this case, the process control system diagnostic application 144), and request that the second maintenance engineer enter his or her corresponding digital safety lock key (reference 166). Additionally or alternatively, the maintenance application may utilize an electronic transmission to inform the second maintenance engineer of the unlock request and his or her digital safety lock key (reference 166). The second engineer may indicate his or her assent and provide his or her digital safety lock key to the maintenance application, e.g., via the user interface of the second locking party device 142*b* or via a return electronic transmission (reference 168). Upon receiving affirmative confirmation and the digital safety locking key from the second engineer 168, the maintenance application executing at the locking party device 142*b* may directly provide (reference 170) the second locking party's digital safety lock key (optionally including the indication of the identification of the second locking party) to the field device 102, or may provide the digital safety lock key to the diagnostic application executing at the process control system device 144 for forwarding to the field device 102 (not shown).

In any case, upon the field device 102 receiving the second digital safety lock key (which optionally may include an indication of the identification of the second maintenance engineer) and verifying the received, second digital safety lock key's accuracy against the stored, second digital safety lock key and the stored identification of the second locking party, the field device 102 may deactivate the second digital safety lock corresponding to the second maintenance engineer, and remove the indication of the second engineer and the corresponding second digital safety lock key from local memory (reference 172). However, as the first engineer has not yet provided his or her corresponding digital safety lock key to unlock the first digital safety lock, the field device 102 remains in the locked state (reference 172), e.g., due to the first digital safety lock remaining activated. Thus, in scenarios in which multiple users or parties have activated digital safety locks the field device 102, the field device 102 may transition into the unlocked state or mode only upon receiving and verifying each of the digital safety lock keys associated with each of the users or parties who activated digital safety locks at the field device 102.

At some time thereafter, such as after all team members have completed their respective maintenance activities, the first maintenance engineer enters his or her digital safety lock key at the first locking party device 142*a* (reference 175). Accordingly, the first locking party device 142*b* transmits an indication of the first digital safety lock key to the field device 102 (reference 178). The field device 102 verifies the identity of the first locking party and the received digital safety lock key with respect to the stored indications of the first locking party and the actual, first digital safety lock key, and removes or deactivates the remaining digital safety lock. For example, the field device 102 clears or removes the indications of the first locking party and the first safety lock key, and transitions into the unlocked state with respect to digital safety locks (reference 180). As such, the field device 102 is allowed to respond to communications received from the process control system and other devices.

In some embodiments, providing the correct digital safety lock key for a given locking party may be host-assisted. For example, a host application (e.g., of the process control system and/or of the asset management system) may automatically provide, to a requesting party with appropriate credentials, the correct or actual digital safety lock key for a given locking party. For instance, the host application may have access to a data storage device in which authorized pairs of locking parties and respective digital safety lock keys are stored. In some embodiments, multi-stage authentication of requesting parties may be implemented in order for the requesting parties to obtain digital safety lock keys from the host application.

Further, in embodiments, digital safety locking as shown at FIGS. 2A and 2B may isolate the field device 102 from being accessed during the execution of run-time control, in embodiments. In an example, the locking party 104 is a control device or application, and the field device 102 is locked and prevented from responding to maintenance devices/applications and from responding to other process control system devices or applications 106 (e.g., process control devices, process control applications, etc.), e.g., regarding instructions to change a setpoint or other operating parameters. Various control devices and/or control applications which are able to be locking parties may be designated during provisioning and/or during run-time of the process control system.

Still further, in embodiments, digital safety locking may isolate the field device 102 from being accessed during configuration and configuration updates. For example, the locking party device 104 is a configuration device or application, and the field device 102 is locked and prevented from responding to other maintenance devices/applications and from responding to process control system devices/applications 106, e.g., during device setup, while the configuration device/application is modifying configuration parameters, while firmware updates or patches are being applied, etc. For instance, in an example, only one asset management system would be allowed to perform configuration tasks.

As discussed above, at any time a device which may be subject to being secured by one or more activated digital safety locks may be in one of a set of at least four possible (un)locking modes or states associated with digital safety locking, where the set includes the locking state, the locked state, the unlocking state, and the unlocked state. In some embodiments, though, the subject device may be in one of other (un)locking states and/or sub-states which correspond to different modes of operation associated with the subject device, where the other (un)locking states define more nuanced modes of operation and/or coordination of activities between control system owners and maintenance owners, e.g., to prevent accidental repositioning and use of device components.

For example, in embodiments, the set of (un)locking states of the subject device may include an override state, where the override state generally corresponds to maintenance (e.g., a maintenance technician or a maintenance application) owning (e.g., controlling) the functional operation of the subject device. Additionally, the locked state may include multiple sub-states, such as an override-enabled sub-state and an override-disabled sub-state to allow or prevent entry into override state.

For instance, the locked state may indicate that the subject device has been locked by a party of the process control system, such as a process control operator or process control system application, where the locked state may have an associated sub-state of either override-enabled or override-disabled. The override-enabled sub-state may indicate that maintenance (e.g., maintenance personnel or a maintenance application) is allowed or permitted to override the locked state to perform maintenance (e.g., by sending electronic maintenance instructions to the subject device), and the override-disabled sub-state may indicate that maintenance is not allowed to override (e.g., is prohibited from overriding) the locked state. To illustrate, in an example scenario, maintenance requests to obtain ownership or control of a subject device (e.g., in a manner similar to reference 112 of FIG. 2A) while the subject device is in the locked/override-enabled state. Due to overrides being enabled, the subject device may transition into the override state, thus granting ownership or control of the subject device to maintenance so that maintenance may electronically control components of the subject device. Maintenance may be required to provide the correct digital safety lock key (e.g., in an automatic manner, such as in FIG. 2B) to the digital safety lock in order to cause the digital safety lock to transition from the locked/override-enable state to the override state. In some embodiments, while the subject device is in the override state, the device is functionally unresponsive to instructions or commands issued by devices and/or applications other than devices associated with and/or utilized by the overriding party (in this example scenario, the maintenance device/application). After maintenance has completed its activities on the subject device and releases ownership of the subject device, the subject device may return to the locked/override-enabled state or may transition to the unlocked state.

In another example, if maintenance requests to obtain ownership of the subject device while the subject device's digital safety lock is in the locked/override-disabled state, maintenance may be prohibited from automatically obtaining ownership of the subject device (and thus the subject device remains functionally unresponsive to any electronically-issued maintenance commands) unless explicitly and manually granted permission to do so from the process control system operators. For instance, the locking party may be an owner of the field device, and other parties who are not the owner of the field device may be prohibited from obtaining ownership of the field device while the field device is in the locked mode. For example, upon receiving an indication of the locking party which, in this example, may be an executing process control application, the requesting maintenance party may dialog with the control system operators to discuss timing and other parameters corresponding to potential maintenance access to the subject device. In these situations, the owning process control system operators may be required to actively and expressly deactivate the digital safety lock of the subject device, to change the state of the subject device to locked/override-enabled, or to manually or explicitly provide the corresponding digital safety lock key to maintenance (when appropriate) to allow maintenance access to and/or control of the subject device.

Generally, whether a locked mode is or is not permitted to be overridden (e.g., whether overrides are enabled or disabled) may be pre-defined, e.g., in a configuration of the field device, in a configuration of a control application, in configuration of a maintenance application, etc. The override permissions may be defined based on at least one of: the subject device, the device(s) and/or application(s) which are allowed to be overridden, the device(s) and/or application(s) which may perform the override, or some combination of the thereof. In some cases, manual action (e.g., by control operators, by maintenance technicians, etc.) may change pre-defined or configured override permissions.

Figure 3:
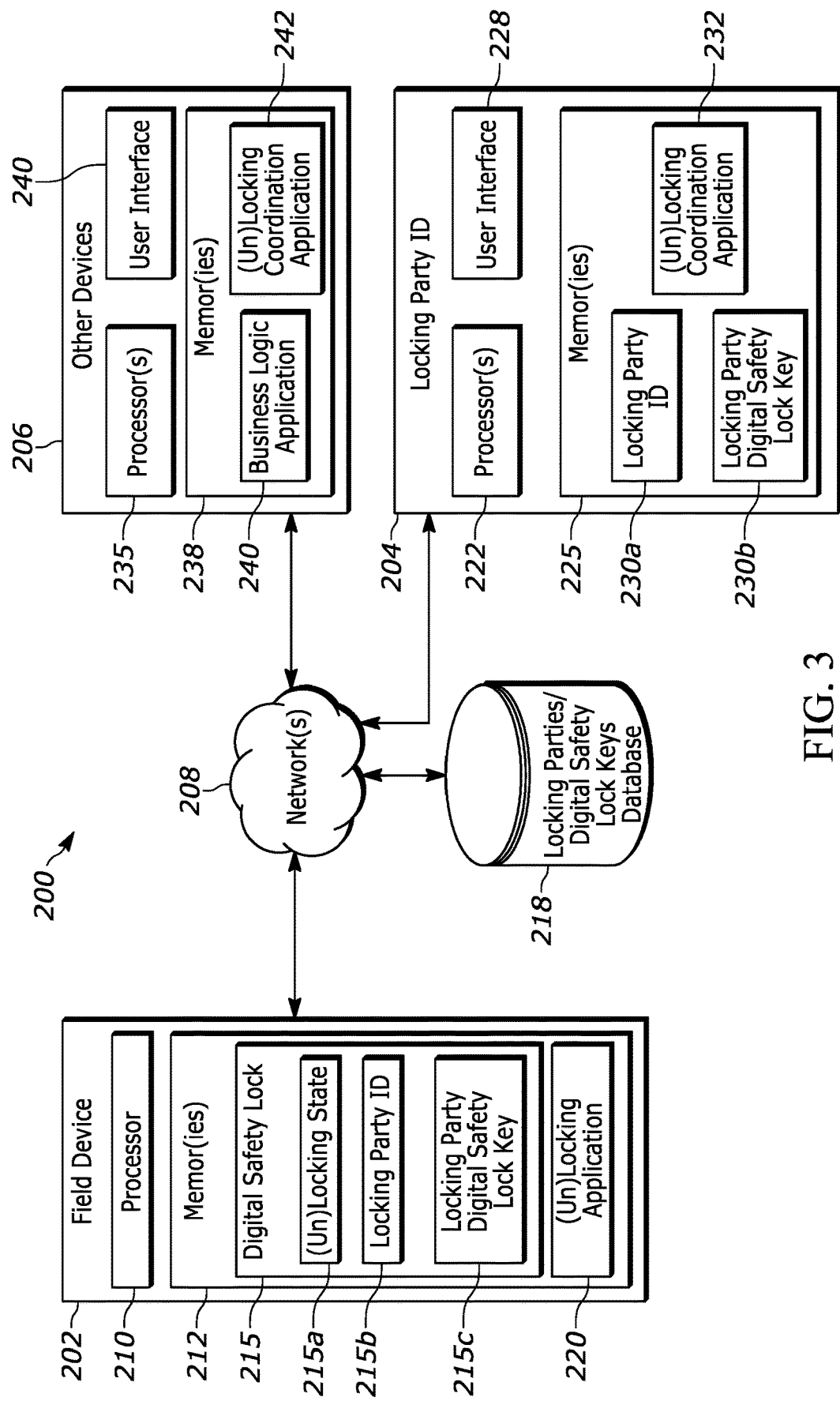
FIG. 3 depicts a block diagram illustrating a system of devices involved in the digital safety locking and unlocking of equipment of an industrial process plant.
Figure 4:
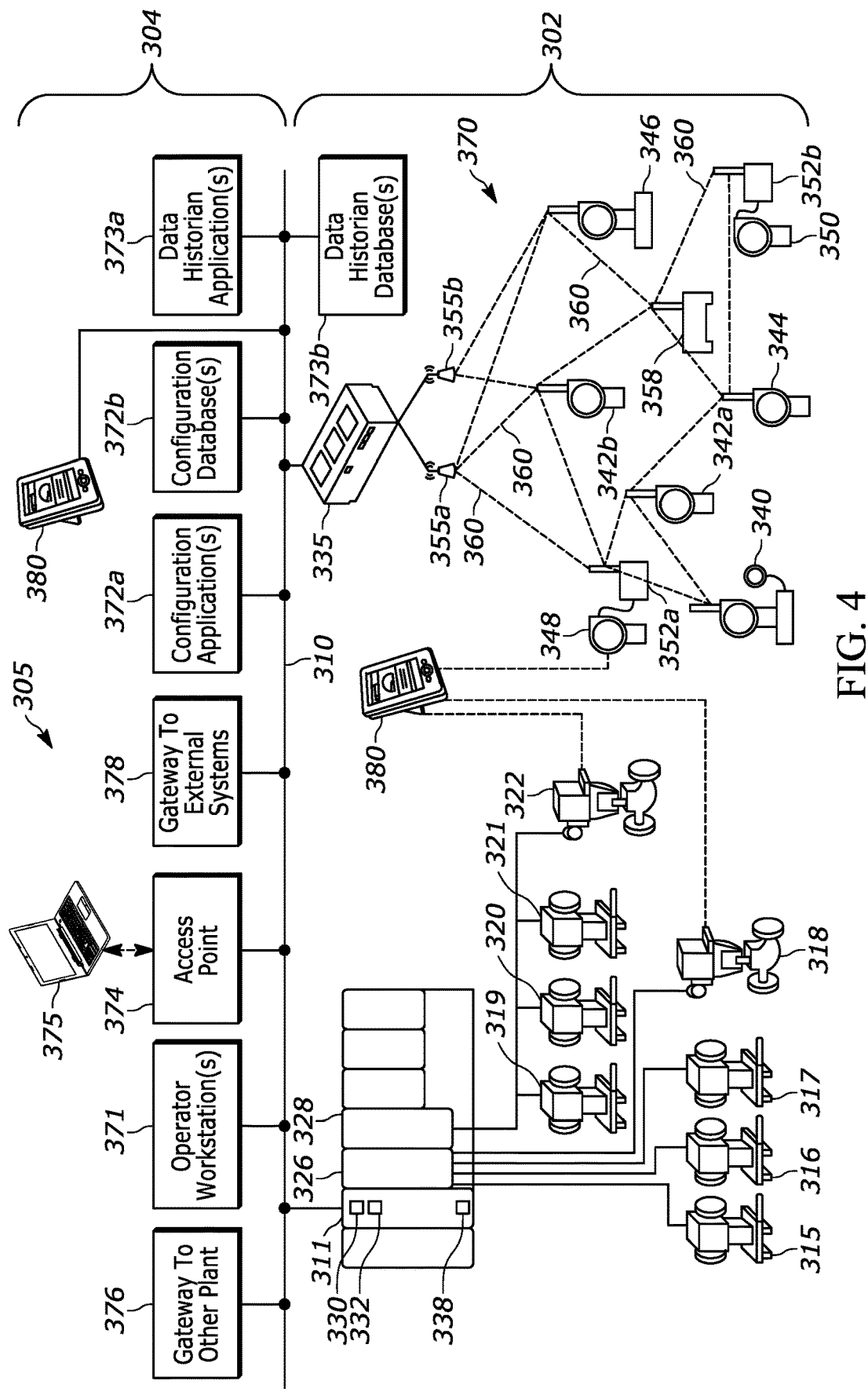
FIG. 4 depicts a block diagram illustrating an example industrial process plant, the devices and equipment of which may be digitally safety locked and unlocked by utilizing one or more of the digital safety locking techniques described herein.

FIG. 3 depicts a block diagram illustrating an example system 200 of devices which may be involved in the digital safety locking and unlocking of equipment or devices disposed in a field environment of an industrial process plant (e.g., the process plant 305 of FIG. 4). The high-level block diagram 200 illustrated in FIG. 3 may include both hardware and software components, as well as various data communications channels for communicating data between the various hardware and software components, such as is described below.

The system 200 may include a field device 202, a locking party device 204, and another device 206. In embodiments, the field device 202 may be the field device 102 depicted in FIGS. 2A and 2B, one of the field devices 315-322 and 340-346 depicted in FIG. 4, or another piece of process control system equipment disposed in the field environment of the industrial process plant. The locking party device may be the locking party device 104 depicted in FIGS. 2A and 2B, and/or the other device 206 may be the other device 106 depicted in FIGS. 2A and 2B. The devices 202, 204, 206 may communicate with one another via one or more networks and/or communication links 208, which may include one or more wired or wireless networks and/or links (such as, and referring to FIG. 4 as an example, a communication backbone 310, wireless network 370, and/or any number of other wired or wireless communication links that support one or more communication protocols, e.g., Wi-Fi and/or other IEEE 802.11 compliant wireless local area network protocols, mobile communication protocols (e.g., WiMAX, LTE, or other ITU-R compatible protocol), short range wireless protocols such as Bluetooth®, industrial communications protocols such as HART, WirelessHART, HART-IP, Profibus, FOUNDATION Fieldbus, etc.). While a single field device 202, a single locking party device 204, a single other device 206, and a single network 208 are depicted in FIG. 3, any multiple number of such components may be present in the system 200 in various examples.

Generally speaking, the field device 202 includes one or more processors 210 and one or more memories 212 (e.g., a volatile memory, a non-volatile memory) which are accessible by the one or more processors 210 (e.g., via a memory controller). The memories 212 may store a digital safety lock 215 (and, in some situations, may store multiple digital safety locks, not shown in FIG. 3). The digital safety lock 215 may be a designated portion of the memories 212, and may include, for example, memory storage for an indication of an (un)locking mode or state 215a of the field device with respect to digital safety locks, an indication of one or more locking parties 215b (if any), and optionally an indication of one or more actual digital safety lock keys or (un)locking keys 215c (if any) of the one or more locking parties 215b and/or a corresponding time stamp indicative of when the device entered into a different (un)locking state. That is, the memories 212 may store an indication of the device status of the field device 202 (i.e., an indication that the field device 202 is in the unlocked state or mode 215a) when the field device 202 transitions into the unlocked state or mode. Similarly, the memories 212 may store an indication of the device status of the field device 202 (i.e., an indication that the field device 202 is in the locked state or mode 215a) when the field device 202 transitions into the locked state or mode. In some examples, the memories 212 may store the indications 215a of the device status of the field device 202 in a log file (not shown) in the memories 212. That is, in some examples, the memories 212 may store an indication of each instance of activating and deactivating the digital safety lock 215 in the log file and, in some cases, store a corresponding time stamp. In some examples, the memories 212 may store an indication of the respective locking parties associated with each instance of activating and deactivating the digital safety lock 215 in the log file. Furthermore, in some examples, the memories 212 may store an indication of whether instances of deactivating the digital safety lock 215 are direct (i.e., when the locking party unlocks the digital safety lock 215) or indirect (i.e., when the locking party provides a key to another party, who in turn unlocks the safety lock 215). While the log file is described as being stored in the memories 212 of the field device, in some examples, the log file may be sent, transmitted, or uploaded to another device or server, or stored in the database 218.

In some embodiments, instead of the field device 202 storing the actual digital safety lock key 215c associated with the locking party 212b, the digital safety lock key 215c associated with the locking party 215b may be stored in a database 218 along with indications of other authorized locking party/digital safety lock key pairs, where the database 218 is accessible to the field device 202 and to other devices subject to digital safety locking and unlocking, e.g., via the network(s) 208. In some embodiments, the database 218 stores contact information associated with the locking parties such as phone numbers, email addresses, chat IDs, shift information (e.g., shift supervisor contact information), and the like, and/or references thereto.

The field device 202 may also include an (un)locking application 220, which may have been downloaded and/or otherwise configured or loaded into the field device 202. The (un)locking application 220 may include a set of computer-executable instructions stored on the one or more memories 212 of the field device 202 and executable by the one or more processors 210, for example. The one or more processors 210 may execute the set of computer-executable instructions of the (un)locking application 220 to digitally safety lock and unlock the field device 202. For example, the (un)locking application 220 may be executable to perform any one or more actions of the field device 102 as described with respect to the communication flow 100 of FIG. 2A and/or with respect to the communication flow of FIG. 2B, the (un)locking application 220 may be executable to perform at least a portion of the method 400 of FIG. 5 and/or the method 450 of FIG. 7, and/or the (un)locking application 220 may be executable to perform other actions and/or methods for unlocking and unlocking a device and/or equipment disposed in the field environment of the industrial plant.

The locking party device 204 may be, for example, a local or remote maintenance device (which may be manually or automatically operated), or the locking party device 204 may be a process control system device which operates during run-time of the process control system (such as process controller, a safety controller, a host or computing device disposed in a back-end environment of the plant, etc.) and which executes an application thereon that requires isolated access to and/or control of the field device 202 (e.g., a control application, a safety application, a diagnostic application, etc.) The locking party device 204 may include one or more processors 222 and one or more memories 225 (e.g., a volatile memory, a non-volatile memory) accessible by the one or more processors 222 (e.g., via a memory controller). FIG. 3 depicts the locking party device 204 as also including a user interface 228; however, in some embodiments (not shown), the locking party device 204 may be communicatively connected to a remotely located user interface 228 via which a user may obtain information from and send information to the locking party device 204. For example, a user may provide his or her locking party identification and corresponding digital safety lock key to the locking party device 204 via the local or remote user interface 228, and the locking party device 204 may store the user's locking party identification 230*a* and corresponding digital safety lock key 230*b* in its memories 225. In an alternate embodiment, the locking party device 204 may store an indication of the user's locking party identification 230*a* in its memories 225, and may access the database 218 to obtain the corresponding digital safety lock key 230*b*. In a still alternative embodiment, the locking party device 204 may store an indication of the user's locking party identification 230*a* in its memories 225, and may automatically generate the corresponding digital safety lock key 230*b*.

The locking party device 204 may include a respective (un)locking coordination application 232, which may have been downloaded and/or otherwise configured or loaded into the locking party device 204. Generally speaking, the (un)locking coordination application 232 coordinates locking and unlocking activities of the field device 202 between the locking party, the field device 202, and another party or device (such as the device 206) which desires access to and/or control of the locked field device 202. The (un)locking coordination application 232 may include a set of computer-executable instructions stored on the one or more memories 225 of the locking party device 204 and executable by the one or more processors 222. The one or more processors 222 may execute the set of computer-executable instructions of the respective (un)locking coordination application 232 to obtain and store locking party identifications and corresponding digital safety lock keys, transmit lock commands to the field device 202, respond to requests (either from the field device 202, the user interface 228, and/or other devices 206) to unlock the field device 202 and/or to provide a digital safety lock key corresponding to a provided locking party identification, and other actions pertaining to digitally safety locking and unlocking the field device 202. For example, the (un)locking coordination application 232 may be executable to perform any one or more actions of the locking party device 104 as described with respect to the communication flow 100 of FIG. 2A and/or with respect to the communication flow of FIG. 2B, the (un)locking coordination application 232 may be executable to perform at least a portion of the method 400 of FIG. 5 and/or the method 450 of FIG. 7, and/or the (un)locking coordination application 232 may be executable to perform other coordinating actions and/or coordinating methods for unlocking and unlocking a device and/or equipment disposed in the field environment of the industrial plant with respect to the subject device, the locking party, and to other devices or parties which request unlocking and/or digital safety lock keys.

The other device 206 depicted in FIG. 3 may be a device which requests access to and/or control of the field device 202 after the field device 202 has been locked by the locking party device 204. For example, the other device 206 may be a local or remote maintenance device (which may be manually or automatically operated), or the device 206 may be a process control system device which operates during run-time of the process control system (such as process controller, a safety controller, a host or back-end computing device, etc.) and executes an application thereon which requires access to and/or control of the field device 202 (e.g., a control application, a safety application, a diagnostic application, etc.). The other device 206 may include one or more processors 235 and one or more memories 238 (e.g., a volatile memory, a non-volatile memory) which are accessible by the one or more processors 235 (e.g., via a memory controller). The memories 238 may store a business logic application 240, which may comprise a set of computer-executable instructions which are executable by the one or more processors 235 to perform business logic of the device 206 pertaining to the field device 202 (such as control routines, safety routines, maintenance routines, configuration routines, diagnostic routines, and the like) which requires access to and/or control of the field device 202.

The memories 238 of the other device 206 may further store a respective (un)locking coordination application 242, which may comprise a set of computer-executable instructions which are executable by the processor(s) 235 to, for example, lock (or attempt to lock) a subject device, such as the field device 202, request a locking party to unlock a locked device or to provide a digital safety lock key corresponding to the locking party, and/or other actions related to (un)locking subject devices. For example, the respective (un)locking coordination application 242 of the other device 206 may be executable to perform any one or more actions of the device 106 as described with respect to the communication flow 100 of FIG. 2A and/or with respect to the communication flow of FIG. 2B, the respective (un)locking coordination application 242 may be executable to perform at least a portion of the method 430 of FIG. 6, and/or the (un)locking application 242 may be executable to perform other actions and/or methods for locking, requesting unlocking, and/or unlocking a device and/or equipment disposed in the field environment of the industrial plant. To illustrate, the business logic application 240 may require, during its execution, access to the field device 202, and as such may request information from and/or request the field device 202 to perform some kind of action related to the business logic application 240. When the field device 202 is in an unlocked state 215*a* with respect to digital safety locks, the business logic application 240 may execute in-line, including gaining access to the field device 202, obtaining information from the field device 202, instructing the field device 202 to perform functional actions, etc. However, when the field device 202 is in a locked state 215*a* with respect to digital safety locks, the field device 202 may indicate to the business logic application 240 that it is locked, and may provide an indication of the locking party identification 215*c* to the device 206. Subsequently, the respective (un)locking coordination application 242 may process the locking party identification 215*c* to coordinate any unlocking activities with the locking party device 204 and/or the locking party, such as in manners described elsewhere within this disclosure.

FIG. 4 is a block diagram of an example process plant, process control system, or process control environment 305 in which field devices 102, 202, locking party devices 104, 204, and other devices 106, 206 may operate, e.g., in manners such as described above with respect to FIGS. 2A, 2B, and 3. The process plant 305 includes one or more process controllers that receive signals indicative of process measurements made by field devices, process this information to implement a control routine, and generate control signals that are sent over wired or wireless process control communication links or networks to other field devices to control the operation of a process in the plant 305. Typically, at least one field device performs a physical function (e.g., opening or closing a valve, increasing or decreasing a temperature, taking a measurement, sensing a condition, etc.) to control the operation of a process. Some types of field devices communicate with controllers by using I/O devices. Process controllers, field devices, and I/O devices may be wired or wireless, and any number and combination of wired and wireless process controllers, field devices and I/O devices may be included in the process plant environment or system 305.

For example, FIG. 4 illustrates a process controller 311 that is communicatively connected to wired field devices 315-322 via input/output (I/O) cards 326 and 328, and that is communicatively connected to wireless field devices 340-346 via a wireless gateway 335 and a process control data highway or backbone 310. The process control data highway 310 may include one or more wired and/or wireless communication links, and may be implemented using any desired or suitable or communication protocol such as, for example, an Ethernet protocol. In some configurations (not shown), the controller 311 may be communicatively connected to the wireless gateway 335 using one or more communications networks other than the backbone 310, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth, HART, WirelessHART, Profibus, FOUNDATION Fieldbus, etc.

The controller 311 may operate to implement a batch process or a continuous process using at least some of the field devices 315-322 and 340-346. In an embodiment, in addition to being communicatively connected to the process control data highway 310, the controller 311 is also communicatively connected to at least some of the field devices 315-322 and 340-346 using any desired hardware and software associated with, for example, standard 4-20 mA devices, I/O cards 326, 328, and/or any smart communication protocol such as the FOUNDATION Fieldbus protocol, the HART protocol, the WirelessHART protocol, etc. In FIG. 4, the controller 311, the field devices 315-322 and the I/O cards 326, 328 are wired devices, and the field devices 340-346 are wireless field devices. Of course, the wired field devices 315-322 and wireless field devices 340-346 could conform to any other desired standard(s) or protocols, such as any wired or wireless protocols, including any standards or protocols developed in the future. For example, at least some of the wired field devices 315-322 and the wireless field devices 340-346 may utilize protocols supported by Advanced Physical Layer (APL) technology.

The process controller 311 of FIG. 4 includes a processor 330 that implements or oversees one or more process control routines 338 (e.g., that are stored in a memory 332). The processor 330 is configured to communicate with the field devices 315-322 and 340-346 and with other nodes communicatively connected to the controller 311. It should be noted that any control routines or modules described herein may have parts thereof implemented or executed by different controllers or other devices if so desired. Likewise, the control routines or modules 338 described herein which are to be implemented within the process control system 305 may take any form, including software, firmware, hardware, etc. Control routines may be implemented in any desired software format, such as using object-oriented programming, ladder logic, sequential function charts, function block diagrams, or using any other software programming language or design paradigm. The control routines 338 may be stored in any desired type of memory 332, such as random access memory (RAM), or read only memory (ROM). Likewise, the control routines 338 may be hardcoded into, for example, one or more EPROMs, EEPROMs, application specific integrated circuits (ASICs), or any other hardware or firmware elements. Thus, the controller 311 may be configured to implement a control strategy or control routine (e.g., respective business logic) in any desired manner.

The controller 311 implements a control strategy using what are commonly referred to as function blocks, where each function block is an object or other part (e.g., a subroutine) of an overall control routine and operates in conjunction with other function blocks (via communications called links) to implement process control loops within the process control system 305. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 305. Of course, hybrid and other types of function blocks exist. Function blocks may be stored in and executed by the controller 311, which is typically the case when these function blocks are used for, or are associated with standard 4-20 mA devices and some types of smart field devices such as HART devices, or may be stored in and implemented by the field devices themselves, which can be the case with FOUNDATION® Fieldbus devices. The controller 311 may include one or more control routines 338 that may implement one or more control loops which are performed by executing one or more of the function blocks.

The wired field devices 315-322 may be any types of devices, such as sensors, valves, transmitters, positioners, etc., while the I/O cards 326 and 328 may be any types of I/O devices conforming to any desired communication or controller protocol. In FIG. 4, the field devices 315-318 are standard 4-20 mA devices or HART devices that communicate over analog lines or combined analog and digital lines to the I/O card 326, while the field devices 319-322 are smart devices, such as FOUNDATION® Fieldbus field devices, that communicate over a digital bus to the I/O card 328 using a FOUNDATION® Fieldbus communications protocol. In some embodiments, though, at least some of the wired field devices 315, 316 and 318-321 and/or at least some of the I/O cards 326, 328 additionally or alternatively communicate with the controller 311 using the process control data highway 310 and/or by using other suitable control system protocols (e.g., Profibus, DeviceNet, Foundation Fieldbus, ControlNet, Modbus, HART, etc.).

In FIG. 4, the wireless field devices 340-346 communicate via a wireless process control communication network 370 using a wireless protocol, such as the WirelessHART protocol. Such wireless field devices 340-346 may directly communicate with one or more other devices or nodes of the wireless network 370 that are also configured to communicate wirelessly (using the wireless protocol or another wireless protocol, for example). To communicate with one or more other nodes that are not configured to communicate wirelessly, the wireless field devices 340-346 may utilize a wireless gateway 335 connected to the process control data highway 310 or to another process control communications network. The wireless gateway 335 provides access to various wireless devices 340-358 of the wireless communications network 370. In particular, the wireless gateway 335 provides communicative coupling between the wireless devices 340-358, the wired devices 311-328, and/or other nodes or devices of the process control plant 305. For example, the wireless gateway 335 may provide communicative coupling by using the process control data highway 310 and/or by using one or more other communications networks of the process plant 305.

Similar to the wired field devices 315-322, the wireless field devices 340-346 of the wireless network 370 perform physical control functions within the process plant 305, e.g., opening or closing valves, or taking measurements of process parameters. The wireless field devices 340-346, however, are configured to communicate using the wireless protocol of the network 370. As such, the wireless field devices 340-346, the wireless gateway 335, and other wireless nodes 352-358 of the wireless network 370 are producers and consumers of wireless communication packets.

In some configurations of the process plant 305, the wireless network 370 includes non-wireless devices. For example, in FIG. 4, a field device 348 of FIG. 4 is a legacy 4-20 mA device and a field device 350 is a wired HART device. To communicate within the network 370, the field devices 348 and 350 are connected to the wireless communications network 370 via a wireless adaptor 352a, 352b. The wireless adaptors 352a, 352b support a wireless protocol, such as WirelessHART, and may also support one or more other communication protocols such as Foundation® Fieldbus, PROFIBUS, DeviceNet, etc. Additionally, in some configurations, the wireless network 370 includes one or more network access points 355a, 355b, which may be separate physical devices in wired communication with the wireless gateway 335 or may be provided with the wireless gateway 335 as an integral device. The wireless network 370 may also include one or more routers 358 to forward packets from one wireless device to another wireless device within the wireless communications network 370. In FIG. 4, the wireless devices 340-346 and 352-358 communicate with each other and with the wireless gateway 335 over wireless links 360 of the wireless communications network 370, and/or via the process control data highway 310.

In FIG. 4, the process control system 305 includes one or more operator workstations 371 that are communicatively connected to the data highway 310. Via the operator workstations 371, operators may view and monitor run-time operations of the process plant 305, as well as take any diagnostic, corrective, maintenance, and/or other actions that may be required. At least some of the operator workstations 371 may be located at various, protected areas in or near the plant 305, and in some situations, at least some of the operator workstations 371 may be remotely located, but nonetheless in communicative connection with the plant 305. Operator workstations 371 may be wired or wireless computing devices.

The example process control system 305 is further illustrated as including a configuration application 372a and configuration database 372b, each of which is also communicatively connected to the data highway 310. As discussed above, various instances of the configuration application 372a may execute on one or more computing devices (not shown) to enable users to create or change process control modules and download these modules via the data highway 310 to the controllers 311, as well as enable users to create or change operator interfaces via which in operator is able to view data and change data settings within process control routines. The configuration database 372b stores the created (e.g., configured) modules and/or operator interfaces. Generally, the configuration application 372a and configuration database 372b are centralized and have a unitary logical appearance to the process control system 305, although multiple instances of the configuration application 372a may execute simultaneously within the process control system 305, and the configuration database 372b may be implemented across multiple physical data storage devices. Accordingly, the configuration application 372a, configuration database 372b, and user interfaces thereto (not shown) comprise a configuration or development system 372 for control and/or display modules. Typically, but not necessarily, the user interfaces for the configuration system 372 are different than the operator workstations 371, as the user interfaces for the configuration system 372 are utilized by configuration and development engineers irrespective of whether or not the plant 305 is operating in real-time, whereas the operator workstations 371 are utilized by operators during real-time operations of the process plant 305 (also referred to interchangeably here as "run-time" operations of the process plant 305).

The example process control system 305 includes a data historian application 374A and data historian database 374B, each of which is also communicatively connected to the data highway 310. The data historian application 374A operates to collect some or all of the data provided across the data highway 310, and to historize or store the data in the historian database 374B for long term storage. Similar to the configuration application 372a and configuration database 372b, the data historian application 374A and historian database 374B are centralized and have a unitary logical appearance to the process control system 305, although multiple instances of a data historian application 374A may execute simultaneously within the process control system 305, and the data historian 374B may be implemented across multiple physical data storage devices.

In some configurations, the process control system 305 includes one or more other wireless access points 374 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 374 allow handheld or other portable computing devices (e.g., user interface devices 375) to communicate over a respective wireless process control communication network that is different from the wireless network 370 and that supports a different wireless protocol than the wireless network 370. For example, a wireless or portable user interface device 375 may be a mobile workstation or diagnostic test equipment that is utilized by an operator within the process plant 305 (e.g., an instance of one of the operator workstations 371). In some scenarios, in addition to portable computing devices, one or more process control devices (e.g., controller 311, field devices 315-322, or wireless devices 335, 340-358) also communicate using the wireless protocol supported by the access points 374.

In some configurations, the process control system 305 includes one or more gateways 376, 378 to systems that are external to the immediate process control system 305. Typically, such systems are customers or suppliers of information generated or operated on by the process control system 305. For example, the process control plant 305 may include a gateway node 376 to communicatively connect the immediate process plant 305 with another process plant. Additionally or alternatively, the process control plant 305 may include a gateway node 378 to communicatively connect the immediate process plant 305 with an external public or private system, such as an asset management system (e.g., via which maintenance of the process plant 305 and its components is managed), a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 4 only illustrates a single controller 311 with a finite number of field devices 315-322 and 340-346, wireless gateways 335, wireless adaptors 352, access points 355, routers 358, and wireless process control communications networks 370 included in the example process plant 305, this is only an illustrative and non-limiting embodiment. Any number of controllers 311 may be included in the process control plant or system 305, and any of the controllers 311 may communicate with any number of wired or wireless devices and networks 315-322, 340-346, 335, 352, 355, 358 and 370 to control a process in the plant 305.

Moreover, one or more maintenance devices 380, which may be field device maintenance tools, multi-meters, portable loop power supplies, field device configuration tools, etc., may be intermittently communicatively connected to one or more of the field devices 315-322 and 340-346 and/or to one or more of the buses or communication lines to which the field devices 315-322 and 340-346 are connected (e.g., a HART loop, a Fieldbus segment, etc.), with such connections being illustrated with dotted lines in FIG. 4. Such network connections may include the hardwired lines connecting one or more of the field devices 315-322 to the I/O cards 326 and 328, for example. Alternatively, the maintenance devices 380 may be directly communicatively connected to ones of the field devices 315-322 and 340-346 (e.g., via communication terminals present on the field devices 315-322 and 340-346). In some cases, the maintenance devices 380 may provide power to the field devices 315-322 and 340-346 or to a wire loop to which it the field devices 315-322 and 340-346 are connected. Moreover, the maintenance devices 380 may enable a user to communicate with, configure, perform maintenance activities on, and/or diagnose one or more of the field devices 315-322 and 340-346 when these field devices are installed in the plant. In still other cases, the maintenance devices 380 may include wireless interfaces that may be used to connect wirelessly to one or more of the field devices 315-322 and 340-346, such as a Bluetooth interface, a Wi-Fi interface, or a wireless process control protocol interface or connection, such as those that use the WirelessHART protocol. The maintenance devices 380 described herein are generally described for configuring, supporting, and maintaining field devices and are thus shown as field device communicators which may be used to, for example, support process measurement devices, such as pressure, temperature, level, flow analytical sensor, flow meters, valve positioners, etc. However, the maintenance devices 380 could be used to support, connect to, maintain, communicate with, or otherwise be used with other types of devices including, for example, rotating equipment, vibration detection and analysis equipment, power generating equipment, switches, motors, pumps, compressors, drives, mechanical vessels, such as tanks, pipes, etc., electrical power distribution devices, switch gear, motor control centers any other stand-alone equipment (e.g., equipment not communicatively connected to a process controller, for example), or any other types of industrial equipment. In these cases, the maintenance devices 380 could have various different types of communication and electrical generation and detection hardware (e.g., voltage, current, impedance, etc. generation and detection equipment) to perform maintenance on, configuration of, and/or communication with these other types of industrial equipment. Further, although not shown in FIG. 4, in embodiments the maintenance devices 380 may communicatively connect to an asset management system via which maintenance activities of devices and equipment of the process plant 305 are scheduled, recorded, and otherwise managed.

Further, it is noted that the process plant or control system 305 of FIG. 4 includes a field environment 302 (e.g., "the process plant floor 302") and a back-end environment 304 which are communicatively connected by the data highway 310. As shown in FIG. 4, the field environment 302 includes physical components (e.g., process control devices, networks, network elements, etc.) that are disposed, installed, and interconnected therein to operate to control the process during run-time. For example, the controller 311, the I/O cards 326, 328, the field devices 315-322, and other devices and network components 340-346, 335, 352, 355, 358 and 370 are located, disposed, or otherwise included in the field environment 302 of the process plant 305. Generally speaking, in the field environment 302 of the process plant 305, raw materials are received and processed using the physical components disposed therein to generate one or more products.

The back-end environment 304 of the process plant 305 includes various components such as computing devices, operator workstations, databases or databanks, etc. that are shielded and/or protected from the harsh conditions and materials of the field environment 302. Referring to FIG. 4, the back-end environment 304 includes, for example, the operator workstations 371, the configuration or development systems 372 for control modules and other executable modules, data historian systems 373, and/or other centralized administrative systems, computing devices, and/or functionality that support the run-time operations of the process plant 305. In some examples, one or more maintenance devices 380 as discussed above may be part of the back-end environment 304. For instance, the one or more maintenance devices 380 may communicate with the field devices 315-322 and 340-346 from the back-end environment 304 via the communication backbone 310. Moreover, in some configurations, various computing devices, databases, and other components and equipment included in the back-end environment 304 of the process plant 305 may be physically located at different physical locations, some of which may be local to the process plant 305, and some of which may be remote.

With regard to digital safety locking and unlocking, in embodiments, the field devices 102, 202 discussed above may be any of the field devices 315-322 and 340-346. Additionally or alternatively, the locking party devices/applications 104, 204 may be one of the maintenance devices 380, a maintenance application executing on a maintenance device 380, a process controller 311, a safety controller (not shown), an operator workstation 371 or application executing thereon, a remote operator interface or device 375, a configuration application 372*a*, or other device and/or application disposed in the field environment 302 or in the back-end environment 304 of the plant 305. Still additionally or alternatively, the other devices/applications 106, 206 may be one of the maintenance devices 380, a maintenance application executing on a maintenance device 380, a process controller 311, a safety controller (not shown), an operator workstation 371 or application executing thereon, a remote operator interface 375, a configuration application 372*a*, or other device and/or application disposed in the field environment 302 or in the back-end environment 304 of the plant 305.

Figure 5:
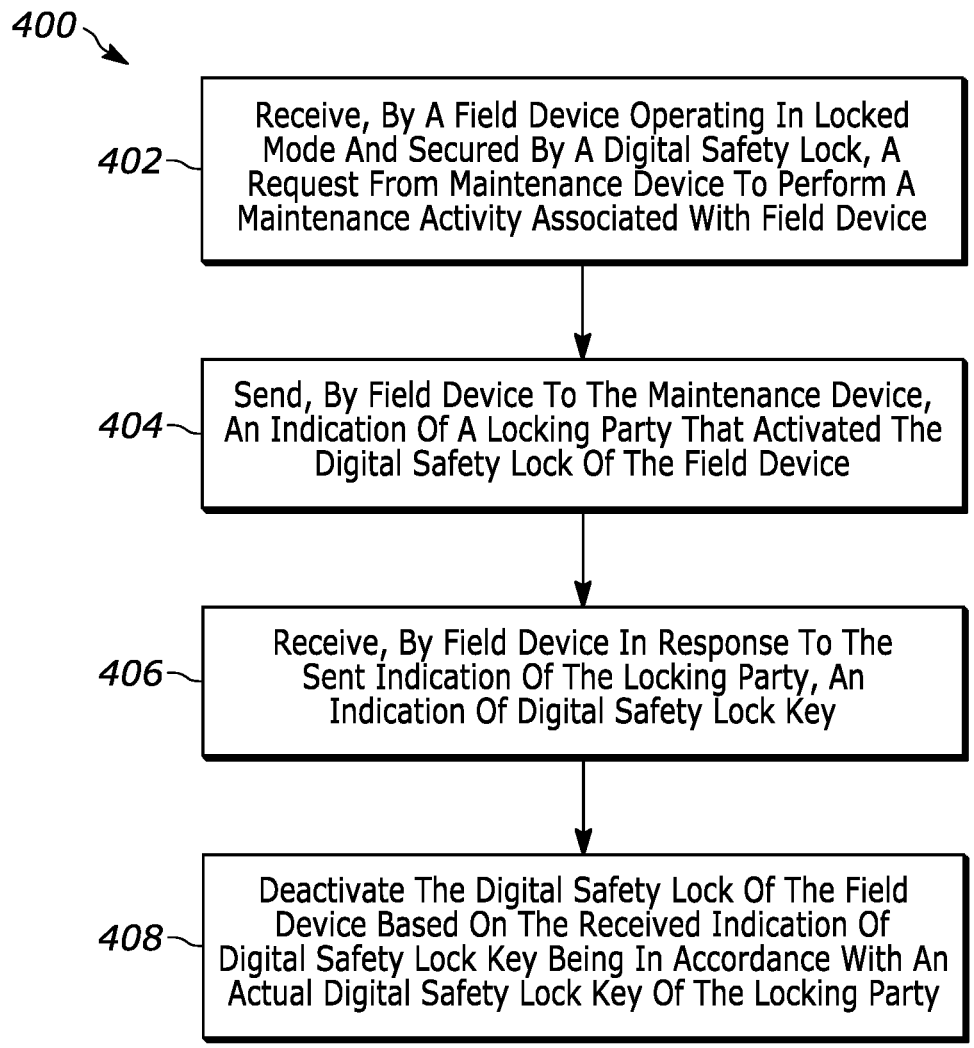
FIG. 5 depicts a flow diagram of an example method of managing a digital safety lock at a field device of an industrial process plant.

FIG. 5 depicts a flow diagram of an example method 400 of managing a digital safety lock at a field device of an industrial process plant. The method 400 may be performed, for example, by the field device 102 of FIGS. 2A and 2B, by the field device 202 of FIG. 3, and/or by any device or piece of equipment having a processor and a memory and disposed in a field environment of a process plant, such as the field environment 302 of the example process plant 300 of FIG. 4. Of course, the method 400 may be performed by other devices and equipment, if desired. In embodiments, the method 400 may include additional or alternate actions. For ease of discussion, and not for limitation purposes, the method 400 is discussed with simultaneous reference to FIGS. 2A, 2B, 3, and 4, and with respect to a locked field device which is secured by an activated digital safety lock.

At block 402, a field device 102, 202 that is in a locked state or mode (e.g., with respect to digital safety locks) and that has an activated digital safety lock may receive a request originating from a maintenance device 106, 206 to perform a maintenance activity associated with the field device 102, 202. Generally speaking, the field device is operable, during run-time of a process control system of the industrial process plant to perform physical actions or functions responsive to control signals to thereby control an industrial process, and the locked mode of the field device is indicative of the field device being functionally unresponsive to commands or instructions issued by devices other than devices that provide indications of respective digital safety lock keys of one or more locking parties that activated one or more digital safety locks at the field device. The field device 102, 202 may receive the request to access and/or control the field device via one or more wireless links and/or networks, and/or via one or more wired links and/or networks, e.g., network(s) 208.

At block 404, because the field device 102, 202 is in the locked state or mode, the field device 102, 202 may send an indication of an identification of the party that activated the digital safety lock at the field device 102, 202 to the maintenance device 106, 206. For example, the (un)locking application 220 executing at the field device 202 may retrieve the identification of the locking party 215*b* stored in its memories 212 and cause the identification of the locking party 215*b* to be transmitted to the maintenance device 206. In some embodiments, the (un)locking application 220 may retrieve contact information for the locking party, e.g., from its memories 212 and/or from the locking parties/digital safety lock keys database 218, and may provide the contact information to the maintenance device 206.

In the example scenario corresponding to the method 400, the locking party 215*b* agrees to unlock the field device 102, 202. As such, at block 406, the field device 102 may receive, e.g., responsive to the sent indication of the locking party, an indication of a digital safety lock key. In some situations, the field device 102, 202 may receive the indication of the digital safety lock key from the maintenance device 106, 206. In some situations, the field device 102, 202 may receive the indication of the digital safety lock key from a device or application associated with the locking party 215*b* (e.g., the locking party device 104, 204), from a host application which administers authorized locking party/digital safety lock keys, etc.

At block 408, the field device 102, 202 may deactivate the digital safety lock when the received digital safety lock key is in accordance with (e.g., matches) the actual digital safety lock key corresponding to the locking party. For example, the (un)locking application 220 at the field device 202 may compare the received digital safety lock key with a stored digital safety lock key 215*c* corresponding to the locking party 215*b* which was previously stored in its memories 212.

When the received digital safety lock key and the stored digital safety lock key 215*c* are in accordance (e.g., when the two keys match, to an exact or to a certain degree), and if no other digital safety locks remain activated at the field device 202, in an example scenario the (un)locking application 220 may cause the field device 202 to transition into an unlocked state or mode, and may update its (un)locking status 215*a* accordingly. That is, when the field device 202 transitions into the unlocked state or mode, a device status associated with the field device 202 may include an indication that the field device 202 is in the unlocked state or mode. Further, the (un)locking application 220 may set both the locking party 215*b* and the locking party digital safety lock key 215*c* to NULL (e.g., may remove or clear the indications of the locking party 215*b* and the indication of the digital safety lock key 215*c* of the locking party 215*b*).

In another example scenario, when the received digital safety lock key and the stored digital safety lock key 215*c* are in accordance, and if no other digital safety locks remain activated at the field device 202, the (un)locking application 220 may cause the field device 202 to transition into an override state or mode, and may update its (un)locking status 215*a* accordingly. Further, the (un)locking application 220 may set the locking party 215*b* to indicate the maintenance device 106, 206, and the (un)locking application 220 may set the locking party digital safety lock key 215*c* to indicate the digital safety lock key of the maintenance device 106, 206.

In some embodiments (not shown), the method 400 may further include the field device 102, 202 receiving, while in the override state with respect to digital safety locks, a maintenance instruction from the maintenance device 106, 206. As the field device 102, 202 is in the override state, the field device 102, 202 may responsively operate in accordance with the received maintenance instruction.

Figure 6:
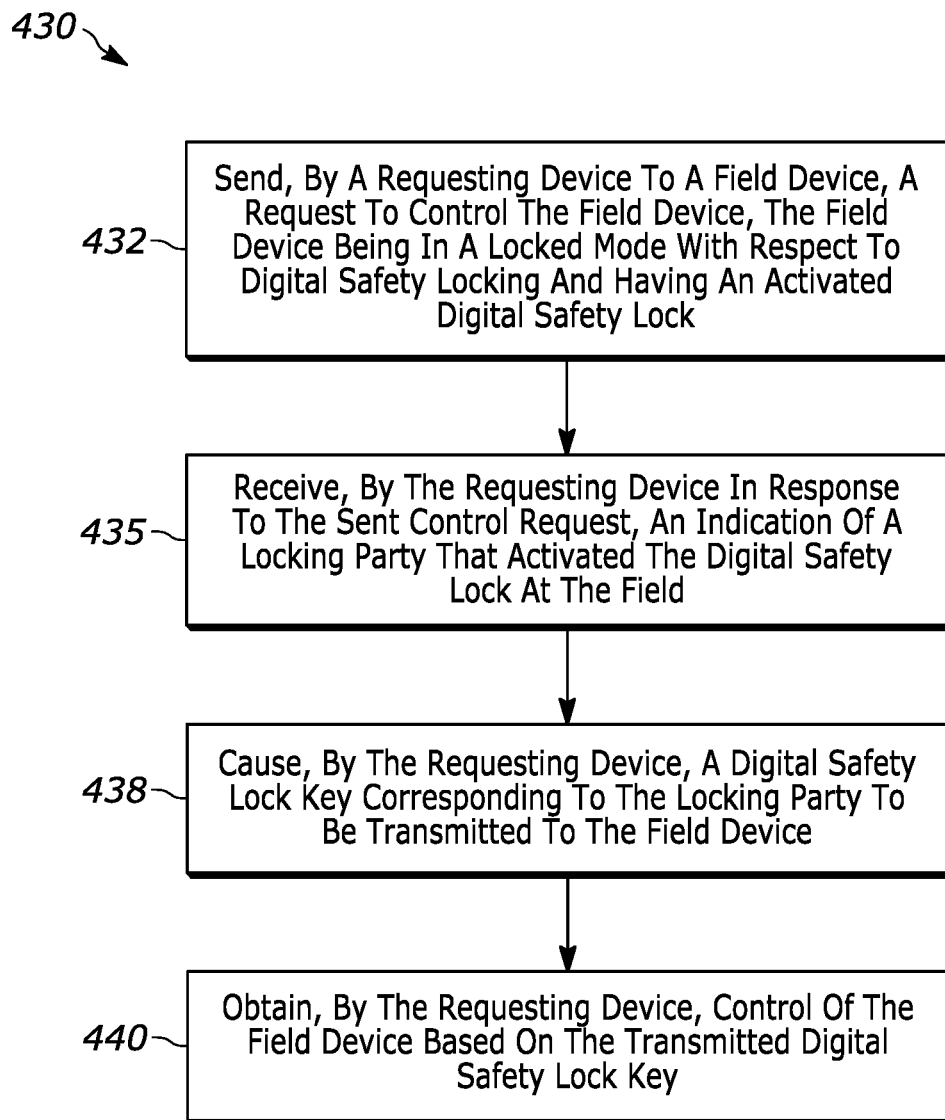
FIG. 6 depicts a flow diagram of an example method of requesting access to and/or control of a digital safety locked device or equipment of an industrial process plant.

FIG. 6 depicts a flow diagram of an example method 430 at a requesting device associated with an industrial process plant. The method 420 may be performed, for example, by the device 106 of FIGS. 2A and 2B, by the device 206 of FIG. 3, and/or by any device or piece of equipment having a processor and a memory and disposed in a field environment of a process plant, such as the example process plant 300 of FIG. 4. Of course, the method 430 may be performed by other devices and equipment, if desired. In embodiments, the method 430 may include additional or alternate actions. For ease of discussion, and not for limitation purposes, the method 430 is discussed with simultaneous reference to FIGS. 2A, 2B, 3, and 4, and with respect to a locked field device which is secured by an activated digital safety lock.

At block 432, the method 430 includes sending, by the requesting device, a request to control a field device of the industrial process plant. The requesting device may be, for example, a process control system device included in a process control system of the industrial process plant (e.g., on which one or more control applications execute), or the requesting device may be a maintenance device (e.g., on which one or more maintenance applications execute). The field device is in a locked mode or state, and is secured by an activated digital safety lock. Generally speaking, the field device is functionally operable, during run-time of a process control system of the industrial process plant, to perform physical actions responsive to control signals to thereby control an industrial process, and the locked mode of the field device is indicative of the field device being functionally unresponsive to commands or instructions issued by devices other than devices that provide indications of respective digital safety lock keys of one or more locking parties that activated one or more digital safety locks at the field device.

At block 435, the method 430 includes receiving, at the requesting device and responsive to the sent control request, an indication that the field device is in the locked mode, such as an indication of the locking party. For example, the field device may access its (un)locking state to determine that the field device is in the locked state, and/or the field device may access the fields or its digital safety lock to obtain the indication of the locking party that activated the digital safety lock. The indication of the locking party received by the requesting device may include, for example, a name or other identification of the locking party, a user corresponding to the locking party, contact information associated with the user, or references thereto (e.g., if such information is stored in another data storage area). Moreover, in some examples, multiple parties may have activated respective digital safety locks at the field device, so that multiple digital safety locks are securing the field device. In such cases, the requesting device may receive indications of the identifications of all locking parties that have activated respective digital safety locks at the field device. A locking party may be, for example, a maintenance device, a maintenance application executing on a maintenance device, a process control system device (e.g., a device included in the process control system), or a control system application executing on a process control system device, to name a few.

At a block 438, the method 430 includes causing, by the requesting device, a digital safety lock key to be transmitted or sent to the field device. For example, upon receiving the indication of the locking party (block 435), the requesting device may display the indication of the identification of the locking party or locking parties (and optionally, of corresponding contact information) via a local or remote user interface associated with the requesting device. A user may contact the locking party/parties to obtain corresponding digital safety lock key/keys, which the user may enter via the user interface. In another example, upon receiving the indication of the locking party (block 435), the requesting device may transmit, to a device associated with the locking party, a request for the appropriate digital safety lock key, which the device associated with the locking party may electronically provide to the requesting device (e.g., after receiving approval from the locking party). In yet another example, upon receiving the indication of the locking party (block 435), the requesting device may utilize a host application executing on another device or server, where the host application stores or otherwise is authorized to access a database storing associations of locking parties and the locking parties' respective digital safety lock keys to obtain the digital safety lock key corresponding to the locking party. In these examples, causing the digital safety lock key to be transmitted to the field device (block 438) may include the requesting device transmitting the obtained digital safety lock key to the field device.

In other examples, upon receiving the indication of the locking party (block 435), the requesting device may transmit, to a device associated with the locking party, a request to unlock the digital safety lock at the field device and/or a request for the appropriate digital safety lock key. In these examples, causing the digital safety lock key to be transmitted to the field device (block 438) may include the device associated with the locking party directly transmitting the digital safety lock key to the field device.

At a block 440, the method 440 includes obtaining, by the requesting device, control of the field device based on the transmitted digital safety lock key corresponding to the locking party. For example, when the field device determines that the digital safety lock key which was transmitted to the field device (block 438) is in accordance with or otherwise matches a stored digital safety lock key corresponding to the locking party, the field device may transition into an (un)locking state which permits the requesting device to obtain control of the field device. For example, the field device may transition into an override state (e.g., if the requesting device is a maintenance device and overrides are enabled), or the field device may transition into an unlocked state (e.g., when the field device does not have any more activated digital safety locks). Upon completing the transition, the field device may notify the requesting device of the completed transition so that the requesting device may obtain control of the field device, in embodiments.

Figure 7:
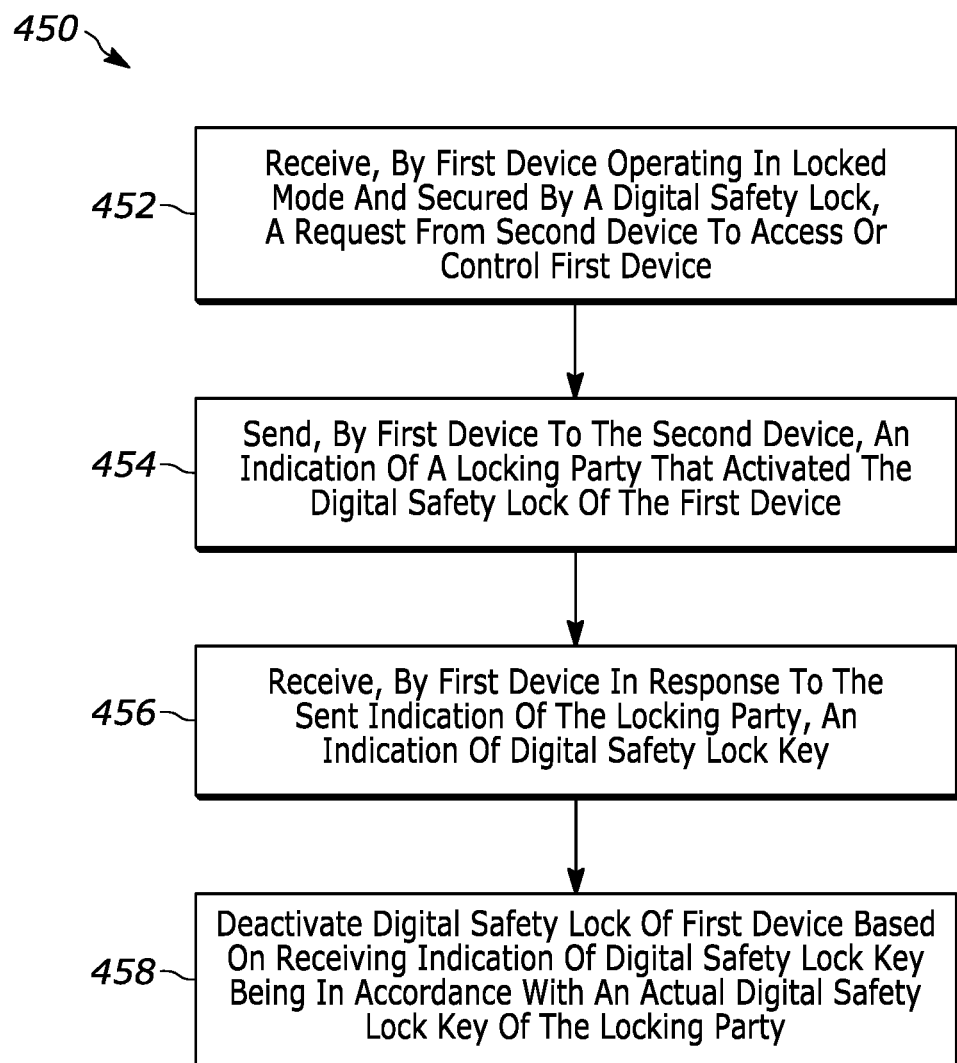
FIG. 7 depicts a flow diagram of an example method of managing a digital safety lock at a device.

FIG. 7 depicts a flow diagram of an example method 450 of managing a digital safety lock. The method 450 may be performed, for example, by any computing device or piece of equipment that has a processor and a memory, is disposed within the field environment 302 of an industrial process plant 305, and is subject to digital safety (un)locking, such as the field device 102 of FIGS. 2A and 2B, and/or the field device 202 of FIG. 3. Of course, the method 450 may be performed by other devices and equipment, if desired. In embodiments, the method 450 may include additional or alternate actions. For ease of discussion, and not for limitation purposes, the method 450 is discussed with simultaneous reference to FIGS. 2A, 2B, 3, and 4, and with respect to a locked device which is secured by an activated digital safety lock.

At block 452, a first device 102, 202 that is in a locked state or mode (e.g., with respect to digital safety locks) and that has an activated digital safety lock may receive a request originating from a second device 106, 206 to access or control the first device 102, 202. Generally speaking, the locked mode of the first device is indicative of the first device being functionally unresponsive to commands or instructions issued by devices other than devices that provide indications of respective digital safety lock keys of one or more locking parties that activated one or more digital safety locks at the first device. The first device 102, 202 may receive the request to access and/or control the first device via one or more wireless links and/or networks, and/or via one or more wired links and/or networks, e.g., network(s) 208.

At block 454, because the first device 102, 202 is in the locked state or mode, the first device 102, 202 may send, to the second device 106, 206, an indication of an identification of the party that activated the digital safety lock at the first device 102. For example, the (un)locking application 220 executing at the first device 202 may retrieve the identification of the locking party 215*b* stored in its memories 212 and cause the identification of the locking party 215b to be transmitted to the second device 206. In some embodiments, the (un)locking application 220 may retrieve contact information for the locking party, e.g., from its memories 212 and/or from the locking parties/digital safety lock keys database 218, and may provide the contact information to the second device 206.

In the example scenario corresponding to the method 450, the locking party 215b agrees to unlock the first device 102, 202. As such, at block 456, the first device 102 may receive, e.g., responsive to the sent indication of the locking party, an indication of a digital safety lock key. In some situations, the first device 102, 202 may receive the indication of the digital safety lock key from the second device 106, 206. In some situations, the first device 102, 202 may receive the indication of the digital safety lock key from a device or application associated with the locking party 215b (e.g., the locking party device 104, 204), from a host application which administers authorized locking party/digital safety lock keys, etc.

At block 458, the first device 102, 202 may deactivate the digital safety lock when the received digital safety lock key is in accordance with (e.g., matches exactly, or to a certain degree) the actual digital safety lock key corresponding to the locking party. For example, the (un)locking application 220 at the first device 202 may compare the received digital safety lock key with a stored digital safety lock key 215c corresponding to the locking party 215b which was previously stored in its memories 212.

When the received digital safety lock key and the stored digital safety lock key 215c are in accordance (e.g., match, to an exact or to a certain degree), and if no other digital safety locks remain activated at the first device 202, in an example scenario the (un)locking application 220 may cause the first device 202 to transition into an unlocked state or mode, and may update its (un)locking status 215a accordingly. That is, when the field device 202 transitions into the locked state or mode, a device status associated with the field device 202 may include an indication that the field device 202 is in the locked state or mode. Further, the (un)locking application 220 may set both the locking party 215b and the locking party digital safety lock key 215c to NULL (e.g., may remove or clear the indications of the locking party 215b and the indication of the digital safety lock key 215c of the locking party 215b).

In another example scenario, when the received digital safety lock key and the stored digital safety lock key 215c are in accordance, and if no other digital safety locks remain activated at the first device 202, the (un)locking application 220 may cause the first device 202 to transition into an override state or mode, and may update its (un)locking status 215a accordingly. Further, the (un)locking application 220 may set the locking party 215b to indicate the second device 106, 206 and may set the locking party digital safety lock key 215c to indicate the digital safety lock key of the second device 106, 206.

In some embodiments (not shown), the method 450 may further include the first device 102, 202 receiving, while in the override state with respect to digital safety locks, an instruction from the second device 106, 206. As the first device 102, 202 is in the override state, the first device 102, 202 may responsively operate in accordance with the received instruction from the second device 106, 206.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof.

What is claimed is:

1. A method, comprising:
  receiving, by a first device in a locked mode and having a digital safety lock that is activated without using a physical lock, a request of a second device to access or control the first device, the locked mode indicative of the first device being functionally unresponsive to instructions issued by devices other than devices that provide indications of respective digital safety lock keys of one or more locking parties that activated one or more digital safety locks at the first device;
  sending, by the first device to the second device, an indication of a locking party included in the one or more locking parties;
  responsive to the sent indication of the locking party, receiving, by the first device, an indication of a digital safety lock key; and
  deactivating, by the first device, a digital safety lock activated by the locking party at the first device when the received digital safety lock key corresponds to an actual digital safety lock key corresponding to the locking party.

2. The method of claim 1, further comprising:
  receiving, at the first device, a locking instruction generated by the locking party; and
  activating, by the first device, the digital safety lock responsive to receiving the locking instruction, including:
    storing the indication of the locking party and an indication of the actual digital safety lock key corresponding to the locking party; and
    storing an indication that the first device is in the locked mode.

3. The method of claim 2, wherein deactivating the digital safety lock of the first device comprises removing the stored indication of the locking party and removing the stored indication of the actual digital safety lock key corresponding to the locking party.

4. The method of claim 2, wherein activating, by the first device, the digital safety lock includes automatically generating, by the first device, the actual digital safety lock key corresponding to the locking party.

5. The method of claim 2, further comprising receiving the indication of the actual digital safety lock key in conjunction with receiving the locking instruction.

6. The method of claim 1, wherein deactivating the digital safety lock of the first device includes, when the first device is not subject to any other activated digital safety lock, transitioning the first device from the locked mode into another mode in which the second device is permitted to access or control the first device.

7. The method of claim 6, wherein:
overrides are enabled at the first device; and
transitioning the first device from the locked mode into the another mode comprises transitioning the first device from the locked mode into an override mode, thereby causing the first device to be functionally responsive to instructions issued by the second device and functionally unresponsive to instructions issued by devices other than the second device.

8. The method of claim 7, wherein transitioning the first device from the locked mode into the override mode includes activating, by the first device, the digital safety lock including:
storing an indication of the second device and an indication of a third digital safety lock key corresponding to the second device; and
storing an indication that the first device is in the override mode.

9. The method of claim 6, wherein overrides are disabled at the first device, and transitioning the first device from the locked mode into the another mode comprises transitioning the first device from the locked mode into an unlocked mode, thereby causing the first device to be functionally responsive to instructions issued by the second device and by other devices.

10. The method of claim 9, wherein transitioning the first device from the locked mode into the unlocked mode includes clearing, by the first device, a stored indication of any locking party and a stored indication of a digital safety lock key corresponding to the any locking party.

11. The method of claim 1, further comprising, responsive to the received indication of the digital safety lock key, comparing the received indication of the digital safety lock key to an indication of the actual digital safety lock key corresponding to the locking party, the indication of the actual digital safety lock key stored at the first device.

12. The method of claim 1, wherein:
the indication of the locking party is a sent indication of the locking party;
the method further comprises receiving an indication of the locking party in conjunction with receiving the indication of the digital safety lock key and comparing the received indication of the locking party with an indication of the locking party stored at the first device; and
deactivating the digital safety lock of the first device when both the received digital safety lock key corresponds to the actual digital safety lock key and the received indication of the locking party corresponds to the stored indication of the locking party.

13. The method of claim 1, wherein sending the indication of the locking party includes sending one or more of: an identifier of the locking party, a name of a user associated with the locking party, or an indication of contact information of the user.

14. The method of claim 1, wherein sending the indication of the locking party includes sending an indication of a user, a group of users, a device, or an application executing on a device utilized by the locking party.

15. The method of claim 1, wherein receiving the indication of the digital safety lock key includes receiving the indication of the digital safety lock key from the second device.

16. The method of claim 1, wherein receiving the indication of the digital safety lock key includes receiving the indication of the digital safety lock key from a device utilized by the locking party.

17. The method of claim 1, wherein receiving the indication of the digital safety lock key includes receiving the indication of the digital safety lock key from a host application, the host application having access to stored association of a plurality of locking parties and respective digital safety lock keys of the plurality of locking parties.

18. The method of claim 1, wherein the locking party is an owner of the first device, and wherein other parties are prohibited from obtaining ownership of the first device while the first device is in the locked mode.

19. The method of claim 1, wherein a device status associated with the first device includes an indication that the first device is in the locked mode.

20. The method of claim 1, further comprising recording each instance of activating and deactivating the digital safety lock in a log file.

21. The method of claim 20, wherein recording each instance of activating and deactivating the digital safety lock in the log file includes recording the respective locking parties associated with each instance of activating and deactivating the digital safety lock in the log file.

22. The method of claim 20, further comprising uploading the log file to a host computing device.

23. A field device, comprising:
a field device input;
a field device output;
a processor coupled between the field device input and the field device output, the processor programmed to:
receive, when the field device is in a locked mode and has a digital safety lock that is activated without using a physical lock, a request of a second device to access or control the field device, the locked mode being indicative of the field device being functionally unresponsive to instructions issued by devices other than devices that provide indications of respective digital safety lock keys of one or more locking parties that activated one or more digital safety locks at the field device;
send, via the field device output to the second device, an indication of a locking party included in the one or more locking parties;
receive via the field device input, in response to the sent indication of the locking party, an indication of a digital safety lock key; and
deactivate a digital safety lock activated by the locking party at the field device when the received digital safety lock key corresponds to an actual digital safety lock key corresponding to the locking party.

24. The field device of claim 23, wherein the processor:
receives, at the field device, a locking instruction generated by the locking party; and
activates, at the field device, the digital safety lock responsive to receiving the locking instruction, including:
storing the indication of the locking party and an indication of the actual digital safety lock key corresponding to the locking party; and
storing an indication that the field device is in the locked mode.

25. The field device of claim 24, wherein deactivating the digital safety lock of the field device comprises removing the stored indication of the locking party and removing the stored indication of the actual digital safety lock key corresponding to the locking party.

26. The field device of claim 24, wherein activating the digital safety lock includes automatically generating, at the field device, the actual digital safety lock key corresponding to the locking party.

27. The field device of claim 24, further comprising receiving the indication of the actual digital safety lock key in conjunction with receiving the locking instruction.

28. The field device of claim 23, wherein deactivating the digital safety lock of the field device includes, when the field device is not subject to any other activated digital safety lock, transitioning the field device from the locked mode into another mode in which the second device is permitted to access or control the field device.

29. The field device of claim 23, wherein the processor, responsive to the received indication of the digital safety lock key, compares the received indication of the digital safety lock key to an indication of the actual digital safety lock key corresponding to the locking party, the indication of the actual digital safety lock key stored in a memory of the field device.

30. The field device of claim 23, wherein:
the indication of the locking party is a sent indication of the locking party; and
the processor further receives an indication of the locking party in conjunction with receiving the indication of the digital safety lock key and compares the received indication of the locking party with an indication of the locking party stored at the field device and deactivates the digital safety lock of the field device when both the received digital safety lock key corresponds to the actual digital safety lock key and the received indication of the locking party corresponds to the stored indication of the locking party.

31. The field device of claim 23, wherein sending the indication of the locking party includes sending one or more of: an identifier of the locking party, a name of a user associated with the locking party, or an indication of contact information of the user.

32. The field device of claim 23, wherein sending the indication of the locking party includes sending an indication of a user, a group of users, a device, or an application executing on a device utilized by the locking party.

33. The field device of claim 23, wherein receiving the indication of the digital safety lock key includes receiving the indication of the digital safety lock key from the second device.

34. The field device of claim 23, wherein receiving the indication of the digital safety lock key includes receiving the indication of the digital safety lock key from a device utilized by the locking party.

35. The field device of claim 23, wherein receiving the indication of the digital safety lock key includes receiving the indication of the digital safety lock key from a host application, the host application having access to stored association of a plurality of locking parties and respective digital safety lock keys of the plurality of locking parties.

36. The field device of claim 23, wherein the locking party is an owner of the field device, and wherein the processor prohibits other parties from obtaining ownership of the field device while the field device is in the locked mode.

37. The field device of claim 23, wherein a device status associated with the field device includes an indication that the field device is in the locked mode.

38. The field device of claim 23, wherein the processor further records each instance of activating and deactivating the digital safety lock in a log file.

39. The field device of claim 38, wherein recording each instance of activating and deactivating the digital safety lock in the log file includes recording the respective locking parties associated with each instance of activating and deactivating the digital safety lock in the log file.

40. The field device of claim 38, wherein the processor further uploads the log file to a host computing device via the field device output.

* * * * *